US008086258B2

(12) United States Patent
Fujii et al.

(10) Patent No.: US 8,086,258 B2
(45) Date of Patent: Dec. 27, 2011

(54) BASE STATION, RECEIVING DEVICE, MOBILE TERMINAL, AND FREQUENCY SHARING METHOD

(75) Inventors: Hiromasa Fujii, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 697 days.

(21) Appl. No.: 12/207,618

(22) Filed: Sep. 10, 2008

(65) Prior Publication Data

US 2009/0088083 A1   Apr. 2, 2009

(30) Foreign Application Priority Data

Sep. 28, 2007  (JP) ................... 2007-255742
Aug. 7, 2008   (JP) ................... 2008-204678

(51) Int. Cl.
*H04B 7/00* (2006.01)
(52) U.S. Cl. .............. 455/522; 455/69; 370/318
(58) Field of Classification Search ............ 455/69, 455/522; 370/318
See application file for complete search history.

(56) References Cited

U.S. PATENT DOCUMENTS

| 7,519,029 B2 | 4/2009 | Takeda et al. |
| 2007/0060190 A1 | 3/2007 | Sanders et al. |
| 2007/0183392 A1 | 8/2007 | Tandai et al. |

FOREIGN PATENT DOCUMENTS

| CN | 1430452 A | 7/2003 |
| JP | 2005-80286 | 3/2005 |

OTHER PUBLICATIONS

Partial European Search Report issued Feb. 3, 2011, in European Patent Application No. 08253038.7.
WiMAX Forum, "Mobile WiMAX-Part I: A Technical Overview and Performance Evaluation", Aug. 2006, pp. 1-53.

*Primary Examiner* — Raymond Dean
(74) *Attorney, Agent, or Firm* — Oblon, Spivak, McClelland, Maier & Neustadt, L.L.P.

(57) ABSTRACT

A disclosed base station is used in a first wireless communication system using a first frequency band that is the same as or adjacent to a second frequency band used by a second wireless communication system, and includes a propagation loss estimation unit configured to estimate propagation loss of a signal in the first frequency band when the signal arrives at a receiving device of the second wireless communication system; a frequency difference calculation unit configured to calculate a frequency difference between the first frequency band and the second frequency band; a maximum transmission power determining unit configured to determine maximum transmission power based on the estimated propagation loss and the calculated frequency difference; and a transmission control unit configured to transmit a signal with transmission power less than or equal to the maximum transmission power determined by the maximum transmission power determining unit.

25 Claims, 24 Drawing Sheets

FIG.13

| PREAMBLE | OPERATING FREQUENCY INFORMATION | TRANSMISSION POWER VALUE | ALLOWABLE INTERFERENCE LEVEL |

FIG.24

| PREAMBLE | BASE STATION IDENTIFICATION NUMBER | BASE STATION FREQUENCY BAND | TRANSMISSION POWER VALUE |

BASE STATION, RECEIVING DEVICE, MOBILE TERMINAL, AND FREQUENCY SHARING METHOD

BACKGROUND OF THE INVENTION

1. Field of the Invention

The present invention generally relates to wireless communication systems. More particularly, the present invention relates to a base station, a receiving device, a mobile terminal, and a frequency sharing method.

2. Description of the Related Art

There is a known method (hereafter called a first method) for sharing the same frequency band by multiple systems in short-distance communications using, for example, ultra-wideband (UWB). In the first method, transmission power of a system is limited to a low level based on a transmission power mask determined statically according to relationships with other systems sharing the same frequency band.

There is another known method (hereafter called a second method) used, for example, in wireless LANs. In the second method, a terminal determines whether an allocated frequency band is being used by a neighboring terminal before starting communications and refrains from transmitting a signal while the neighboring terminal is transmitting a signal.

There is still another known method used in a mobile communication system employing a frequency division multiplexing scheme such as FDMA. In this method, when there are multiple cells adjacent to each other, each cell is divided into an outer area and an inner area and different frequencies are allocated to the inner and outer areas (see, for example, Japanese Patent Application Publication No. 2005-80286 and "Mobile WiMAX—Part I: A Technical Overview and Performance Evaluation", WiMAX Forums March, 2006). For example, as shown in FIG. 1, a frequency commonly used by all the cells is allocated to the inner area where interference by other cells is low and a frequency used by only a part of the cells is allocated to the outer area where interference by other cells is high.

However, the above related art technologies have problems as described below.

With the first method, because transmission power control is not performed flexibly according to operating conditions of other systems, it is difficult to improve frequency use efficiency. Also, it is theoretically difficult to apply the first method to a communication system such as a cellular system where signals are transmitted in a wide area using comparatively high transmission power.

In the second method, transmission conditions in a frequency band adjacent to that of other systems are not taken into account. Also with the second method, because whether it is possible to transmit a signal is determined based only on surrounding conditions without taking into account transmission parameters, it is difficult to efficiently use frequency resources.

SUMMARY OF THE INVENTION

Aspects of the present invention provide a base station, a receiving device, a mobile terminal, and a frequency sharing method that solve or reduce one or more problems caused by the limitations and disadvantages of the related art.

An aspect of the present invention provides a base station in a first wireless communication system using a first frequency band that is the same as or adjacent to a second frequency band used by a second wireless communication system. The base station includes a propagation loss estimation unit configured to estimate propagation loss of a signal in the first frequency band when the signal arrives at a receiving device of the second wireless communication system; a frequency difference calculation unit configured to calculate a frequency difference between the first frequency band and the second frequency band; a maximum transmission power determining unit configured to determine maximum transmission power based on the propagation loss estimated by the propagation loss estimation unit and the frequency difference calculated by the frequency difference calculation unit; and a transmission control unit configured to transmit a signal with transmission power less than or equal to the maximum transmission power determined by the maximum transmission power determining unit.

Another aspect of the present invention provides a base station in a first wireless communication system using a first frequency band that is the same as or adjacent to a second frequency band used by a second wireless communication system. The base station includes a frequency difference calculation unit configured to calculate a frequency difference between the first frequency band and the second frequency band; a distance calculation unit configured to calculate a distance between the base station and a receiving device of the second wireless communication system; a maximum transmission power determining unit configured to determine maximum transmission power based on the frequency difference calculated by the frequency difference calculation unit and the distance calculated by the distance calculation unit; and a transmission control unit configured to transmit a signal with transmission power less than or equal to the maximum transmission power determined by the maximum transmission power determining unit.

Another aspect of the present invention provides a receiving device in a wireless communication system. The receiving device includes a system information storing unit configured to store system information regarding the wireless communication system including the receiving device; and a transmitting unit configured to transmit the system information; wherein the system information includes at least one of an allowable interference level, transmission power used for transmitting the system information, and operating frequency information.

Another aspect of the present invention provides a mobile terminal in a first wireless communication system using a first frequency band that is the same as or adjacent to a second frequency band used by a second wireless communication system. The mobile terminal includes a frequency difference calculation unit configured to calculate a frequency difference between the first frequency band and the second frequency band; a distance calculation unit configured to calculate a distance between the mobile terminal and a receiving device of the second wireless communication system; a maximum transmission power determining unit configured to determine maximum transmission power based on the frequency difference calculated by the frequency difference calculation unit and the distance calculated by the distance calculation unit; and a transmission control unit configured to transmit a signal with transmission power less than or equal to the maximum transmission power determined by the maximum transmission power determining unit.

Still another aspect of the present invention provides a frequency sharing method performed by a base station in a first wireless communication system using a first frequency band that is the same as or adjacent to a second frequency band used by a second wireless communication system. The method includes a frequency difference calculation step of calculating a frequency difference between the first frequency band and the second frequency band; a distance calculation step of calculating a distance between a mobile terminal of the first wireless communication system and a receiving device of the second wireless communication system; a maximum transmission power determining step of determining maximum transmission power based on the frequency difference calculated in the frequency difference calculation step and the distance calculated in the distance calculation step; and a transmission control step of transmitting a signal with transmission power less than or equal to the maximum transmission power determined in the maximum transmission power determining step.

BRIEF DESCRIPTION OF THE DRAWINGS

FIG. 13 is a drawing illustrating a format of a priority system information signal;

FIG. 24 is a drawing illustrating a format of a propagation path measuring signal.

DESCRIPTION OF THE PREFERRED EMBODIMENTS

Preferred embodiments of the present invention are described below with reference to the accompanying drawings.

Throughout the accompanying drawings, the same reference numbers are used for parts having the same functions, and overlapping descriptions of those parts are omitted.

First Embodiment

Figure 1:
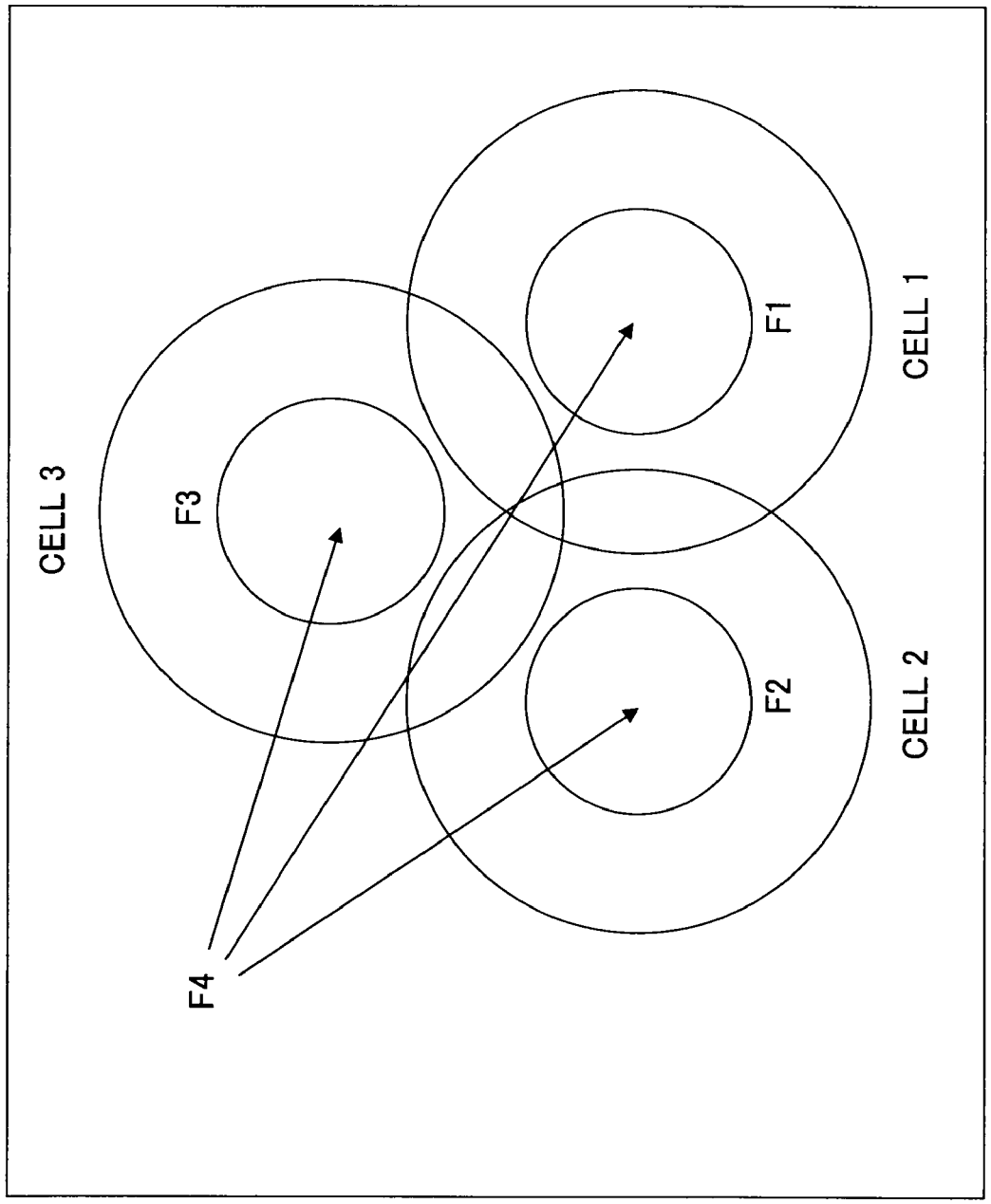
FIG. 1 is a drawing illustrating an exemplary frequency allocation method.
Figure 2:
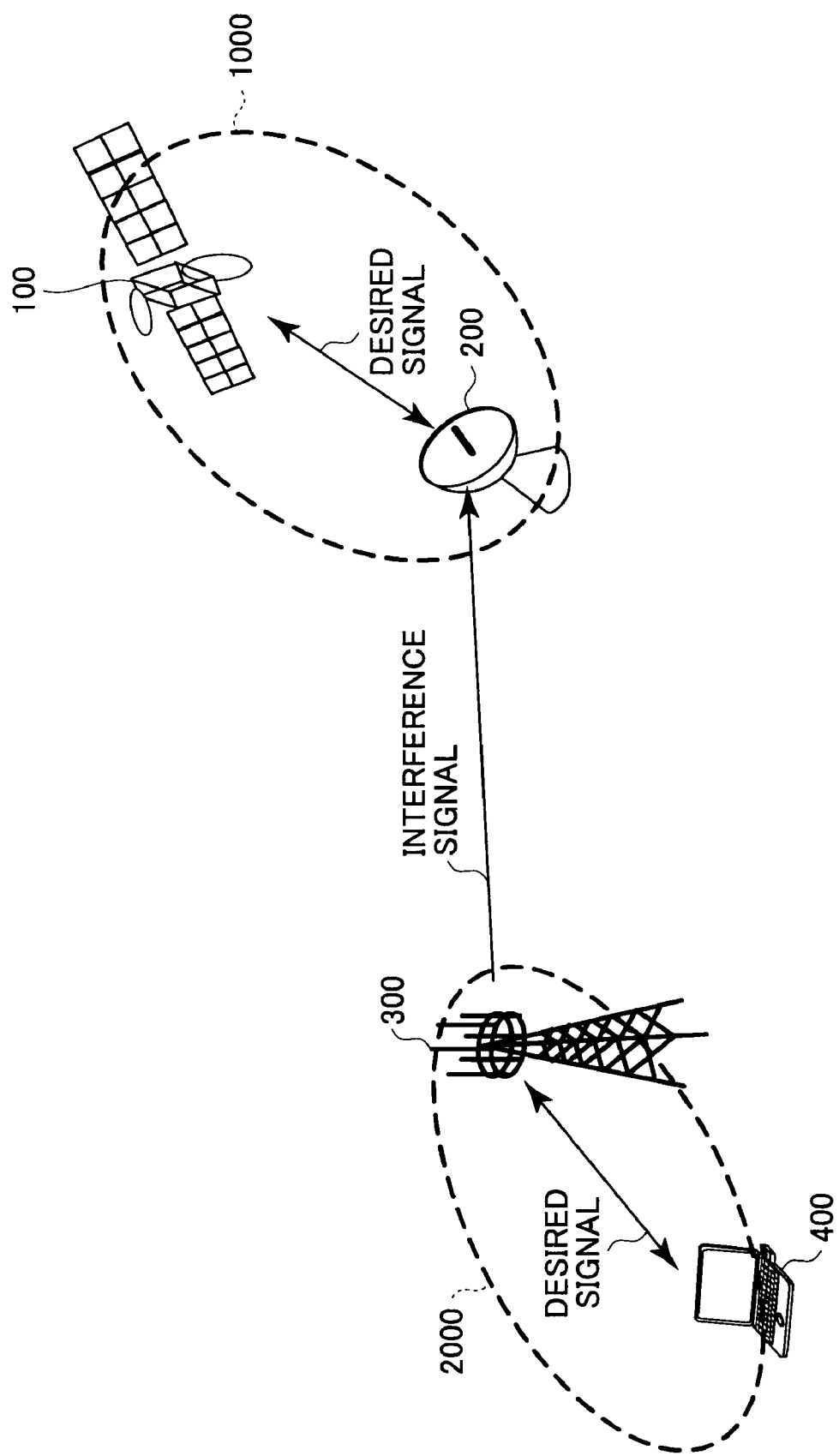
FIG. 2 is a drawing illustrating a communication environment where a wireless communication system according to an embodiment of the present invention is used.

A wireless communication system according to a first embodiment of the present invention is described below with reference to FIG. 2.

Figure 3:
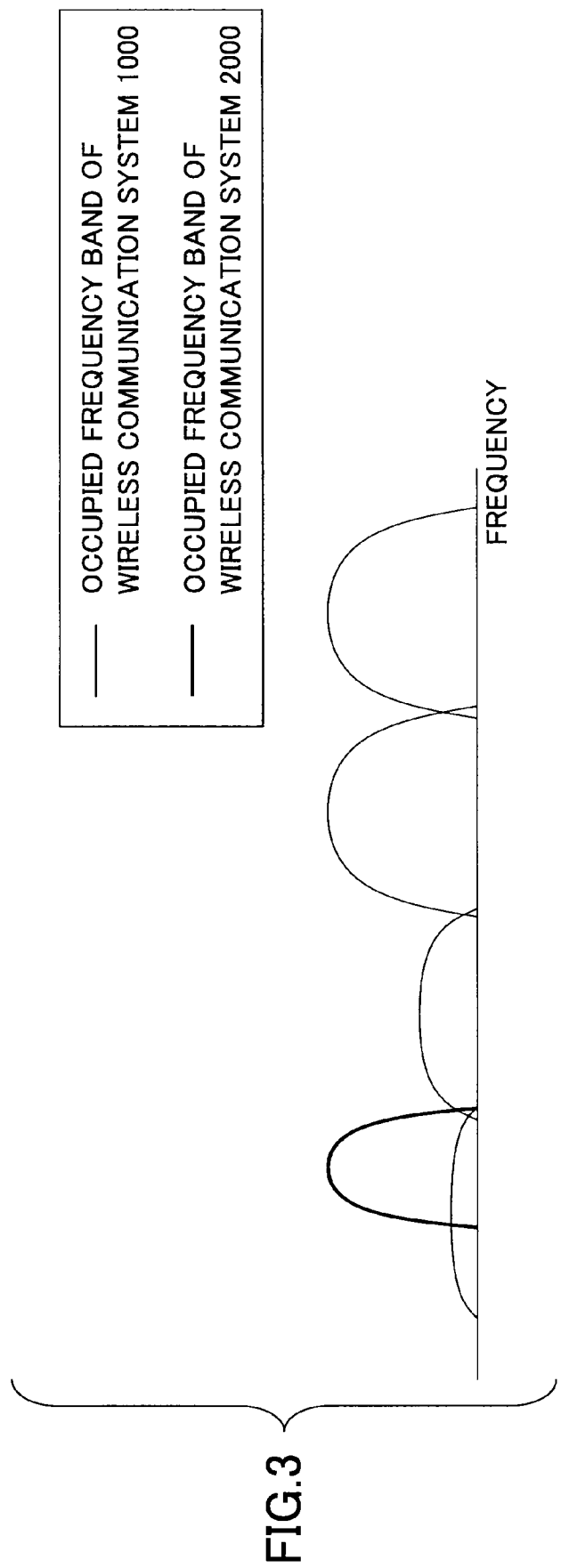
FIG. 3 is a drawing illustrating an exemplary occupied frequency band of a wireless communication system according to an embodiment of the present invention.

A wireless communication system 2000 of this embodiment is used in the same area as and/or an area close (adjacent) to that where a wireless communication system 1000 is used. Also, as shown in FIG. 3, the wireless communication system 2000 uses the same frequency band as and/or a frequency band close (adjacent) to that used by the wireless communication system 1000.

In this embodiment, the wireless communication system 1000 represents an existing wireless communication system and is given priority over the wireless communication system 2000. In the example shown in FIG. 2, the wireless communication system 1000 is represented by a satellite broadcasting system and the wireless communication system 2000 is represented by a mobile communication system.

The wireless communication system 1000 includes a transmitting device 100 and a receiving device 200. The receiving device 200 may be configured as a transceiver. The wireless communication system 1000 may instead be configured as a mobile communication system including a base station and a mobile terminal. In this embodiment, it is assumed that the receiving device 200 is stationary and does not change locations.

The wireless communication system 2000 includes a base station 300 and a mobile terminal 400.

In this embodiment, it is also assumed that downlink signals of the wireless communication system 2000 interfere with the wireless communication system 1000. In such an environment, if the wireless communication systems 1000 and 2000 perform communications independently, the communication quality of the wireless communication system 1000 may be degraded greatly by communications of the wireless communication system 2000.

To solve or reduce this problem, the base station 300 of the wireless communication system 2000 performs communications in such a manner that the communication quality of the wireless communication system 1000, a priority system, is maintained. According to this embodiment, it is not necessary to change configurations of the transmitting device 100 and the receiving device 200 of the wireless communication system 1000 and the mobile terminal 400 of the wireless communication system 2000 from those used when frequencies are not shared by the systems.

The base station 300 of this embodiment is described below with reference to FIG. 4.

The base station 300 includes a transmitting device. The transmitting device includes a priority system information storing unit 302; a base station information storing unit 304; a maximum transmission power determining unit 306 that may be used as a frequency difference calculation unit, a distance calculation unit, a propagation loss estimation unit, and a maximum transmission power determining unit; a transmission control unit 308; and a transmission signal generating unit 310. The transmission control unit 308 and the transmission signal generating unit 310 may be collectively called a transmission control unit.

The priority system information storing unit 302 stores information (priority system information) on a priority system (in this example, the wireless communication system 1000) located close to the base station 300. In other words, the priority system information storing unit 302 stores information on a wireless communication system that shares frequencies with the wireless communication system 2000. The priority system information includes the location of the receiving device 200, an allowable interference level, an operating frequency band, and an operating frequency. The allowable interference level indicates the allowable level of a signal of the wireless communication system 2000 input to a receiving antenna of the receiving device 200. The allowable interference level may be determined based on receiving antenna gain. For example, the allowable interference level is determined based on maximum receiving antenna gain. The priority system information storing unit 302 outputs the priority system information to the maximum transmission power determining unit 306. The priority system information may be input to the priority system information storing unit 302 when the base station 300 is installed or may be updated as needed, for example, via a wired network.

The base station information storing unit 304 stores information (base station information) on the base station 300. The base station information includes the location of the base station 300, adjacent channel leakage power, an operating frequency band, and transmitting antenna gain. The base station information storing unit 304 outputs the base station information to the maximum transmission power determining unit 306.

The maximum transmission power determining unit 306 calculates maximum transmission power that does not affect the communication quality of the priority system based on the base station information input from the base station information storing unit 304 and the priority system information input from the priority system information storing unit 302. For example, the maximum transmission power determining unit 306 calculates the maximum transmission power based on the adjacent channel leakage power input from the base station information storing unit 304 and the operating frequency band and the location of the receiving device 200 input from the priority system information storing unit 302. The calculated maximum transmission power is input to the transmission control unit 308.

More specifically, the maximum transmission power is calculated as described below. First, a frequency difference (or difference in bandwidth) between the operating frequency band of the base station 300 and the operating frequency band of the wireless communication system 1000 is calculated.

Figure 5:
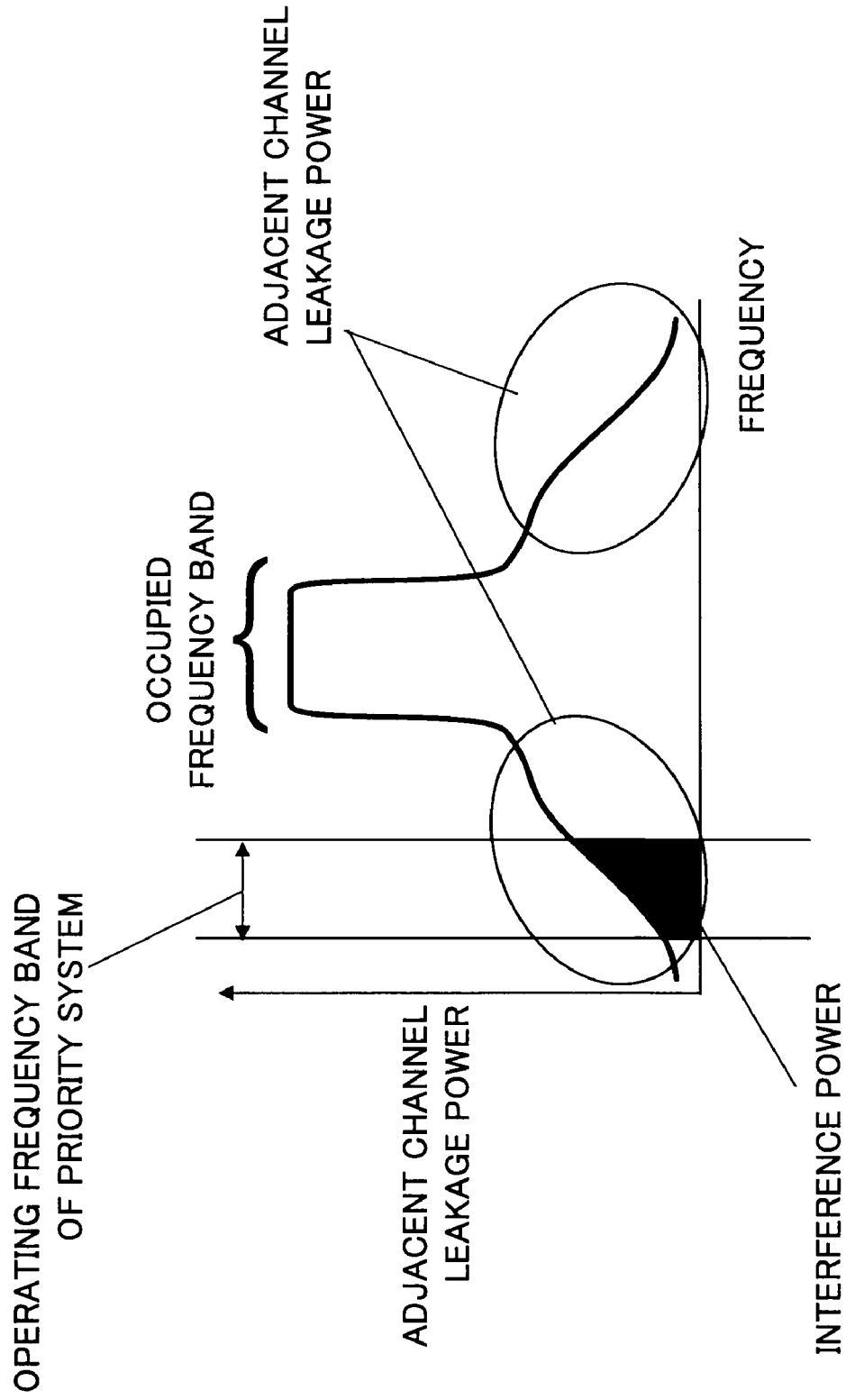
FIG. 5 is a drawing illustrating a frequency waveform of a transmission signal.

Then, based on the calculated frequency difference and the operating frequency band of the wireless communication system 1000, an adjacent channel leakage power ratio is obtained for the operating frequency band of the wireless communication system 1000. Assume that the adjacent channel leakage power ratio is 0 dB when the priority system, i.e., the wireless communication system 1000, and the non-priority system, i.e., the wireless communication system 2000, use the same frequency band. Meanwhile, when both systems use different frequency bands, the adjacent channel leakage power of a transmission signal decreases as the frequency difference increases as shown in FIG. 5. Therefore, the adjacent channel leakage power ratio may be obtained based on the ratio of the mean power density in the operating frequency band of the priority system to the transmission power density in an occupied frequency band. Also, the adjacent channel leakage power ratio may be obtained based on the maximum power density in the operating frequency band of the priority system.

Meanwhile, in many wireless communication systems, the maximum adjacent channel leakage power of a transmission signal is defined as a transmit spectrum mask based on a frequency waveform of the transmission signal. Therefore, the transmission power density in a frequency band of a system may be obtained based on the transmit spectrum mask of the system or based on measured characteristics of a transmitting device.

Next, a geographical distance is calculated based on the location of the base station 300 and the location of the receiving device 200 of the priority system. Then, based on the geographical distance, propagation loss is estimated. The propagation loss may be estimated using a free-space propagation loss formula. For example, free-space propagation loss may be obtained by the following formula (1):

$$20\times\log(f\times d)-27.56 \text{ [dB]} \qquad (1)$$

In formula (1), "f" represents a frequency [MHz] and "d" represents a distance [m].

Then, the maximum transmission power density is obtained by the following formula (2) and the maximum transmission power is obtained by the following formula (3):

$$\begin{aligned}&\text{Maximum transmission power density [dBm/Hz]=allowable interference level (spurious signal level)}\\&\text{[dBm/Hz]+adjacent channel leakage power ratio}\\&\text{[dB]-estimated propagation loss [dB]-transmitting antenna gain [dB]-margin [dB]}\end{aligned} \qquad (2)$$

$$\begin{aligned}&\text{Maximum transmission power [dBm]=maximum}\\&\text{transmission power density [dBm/Hz]+used}\\&\text{bandwidth [dBHz]}\end{aligned} \qquad (3)$$

As the margin, a predetermined value may be used. As the transmitting antenna gain, the maximum transmitting antenna gain may be used.

In this embodiment, the maximum transmission power is dynamically calculated using formulas. Alternatively, a set of maximum transmission power values corresponding to combinations of distances and frequency differences may be obtained and stored in a table in advance, and the maximum transmission power may be selected from the table based on a calculated distance and frequency difference.

The transmission control unit 308 performs transmission control such that signals are transmitted with transmission power less than or equal to the maximum transmission power determined by the maximum transmission power determining unit 306.

The transmission signal generating unit 310 generates a transmission signal. The transmission signal includes user data. The transmission signal generating unit 310 transmits the generated transmission signal under the control of the transmission control unit 308 with transmission power less than or equal to the maximum transmission power determined by the maximum transmission power determining unit 306. Also, the transmission signal generating unit 310 may be configured to determine a combination of a data modulation scheme and a channel coding rate (modulation and coding scheme: MCS) used to transmit user data based on the maximum transmission power.

The above method may be used when the wireless communication systems 1000 and 2000 share at least a part of a frequency band as well as when the wireless communication system 2000 does not use the occupied frequency band of the wireless communication system 1000.

Figure 6:
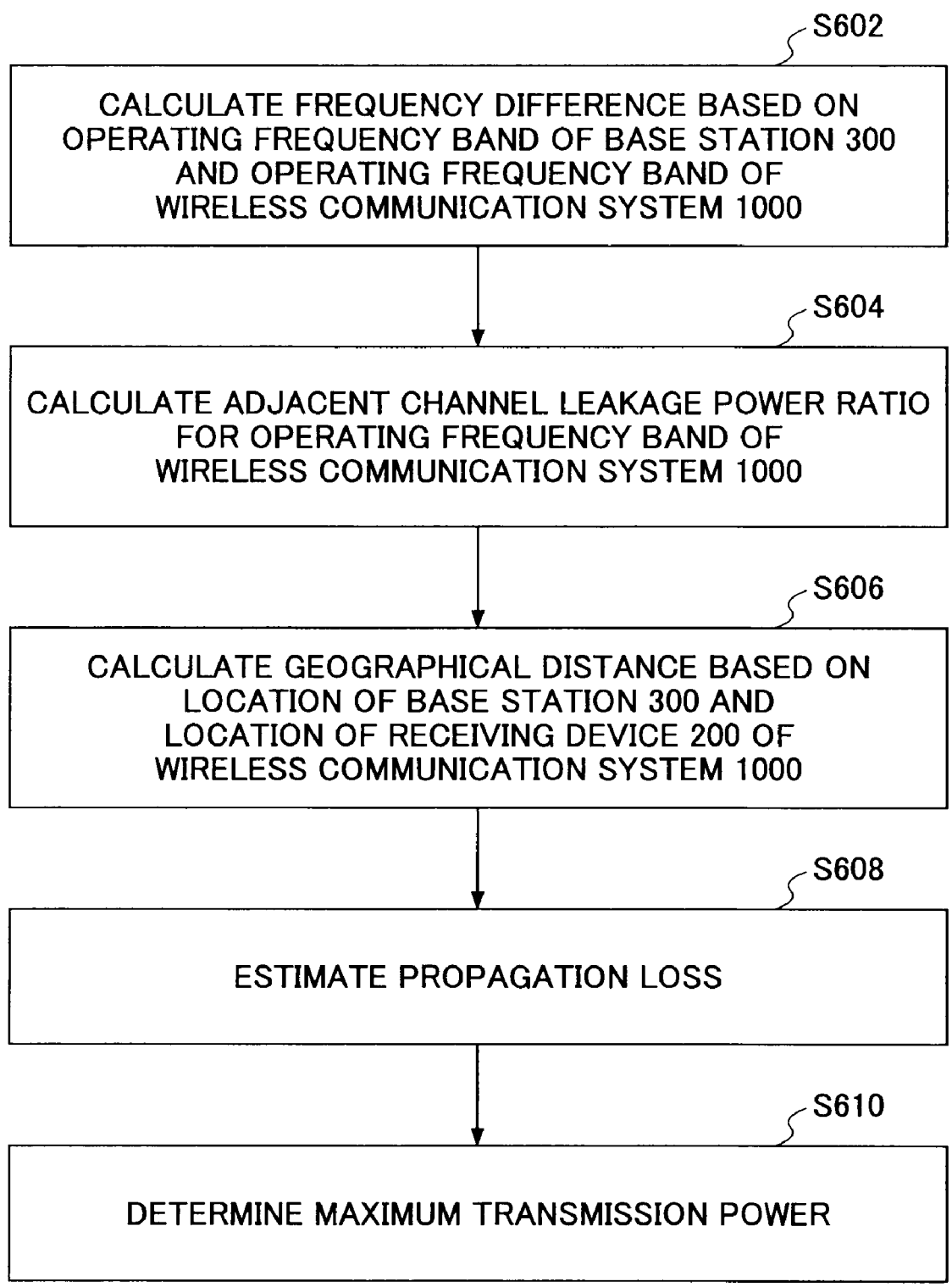
FIG. 6 is a flowchart showing a process performed by a base station according to an embodiment of the present invention.

Next, a process of determining the maximum transmission power by the base station 300 is described with reference to FIG. 6.

The maximum transmission power determining unit 306 calculates a frequency difference between the operating frequency band of the base station 300 and the operating frequency band of the wireless communication system 1000 (step S602).

Next, the maximum transmission power determining unit 306 obtains the adjacent channel leakage power ratio for the operating frequency band of the wireless communication system 1000 based on the calculated frequency difference and the operating frequency band of the wireless communication system 1000 (step S604).

Then, the maximum transmission power determining unit 306 calculates a geographical distance based on the location of the base station 300 and the location of the receiving device 200 of the wireless communication system 1000 (step S606).

After that, the maximum transmission power determining unit 306 estimates propagation loss based on the geographical distance (step S608).

Then, the maximum transmission power determining unit 306 calculates maximum transmission power density and determines the maximum transmission power based on the calculated maximum transmission power density (step S610).

Second Embodiment

A wireless communication system according to a second embodiment of the present invention is described below.

The configuration of the wireless communication system of this embodiment is substantially the same as that described with reference to FIG. 2. Also, the configuration of the base station 300 of this embodiment is substantially the same as that described with reference to FIG. 4.

Figure 7:
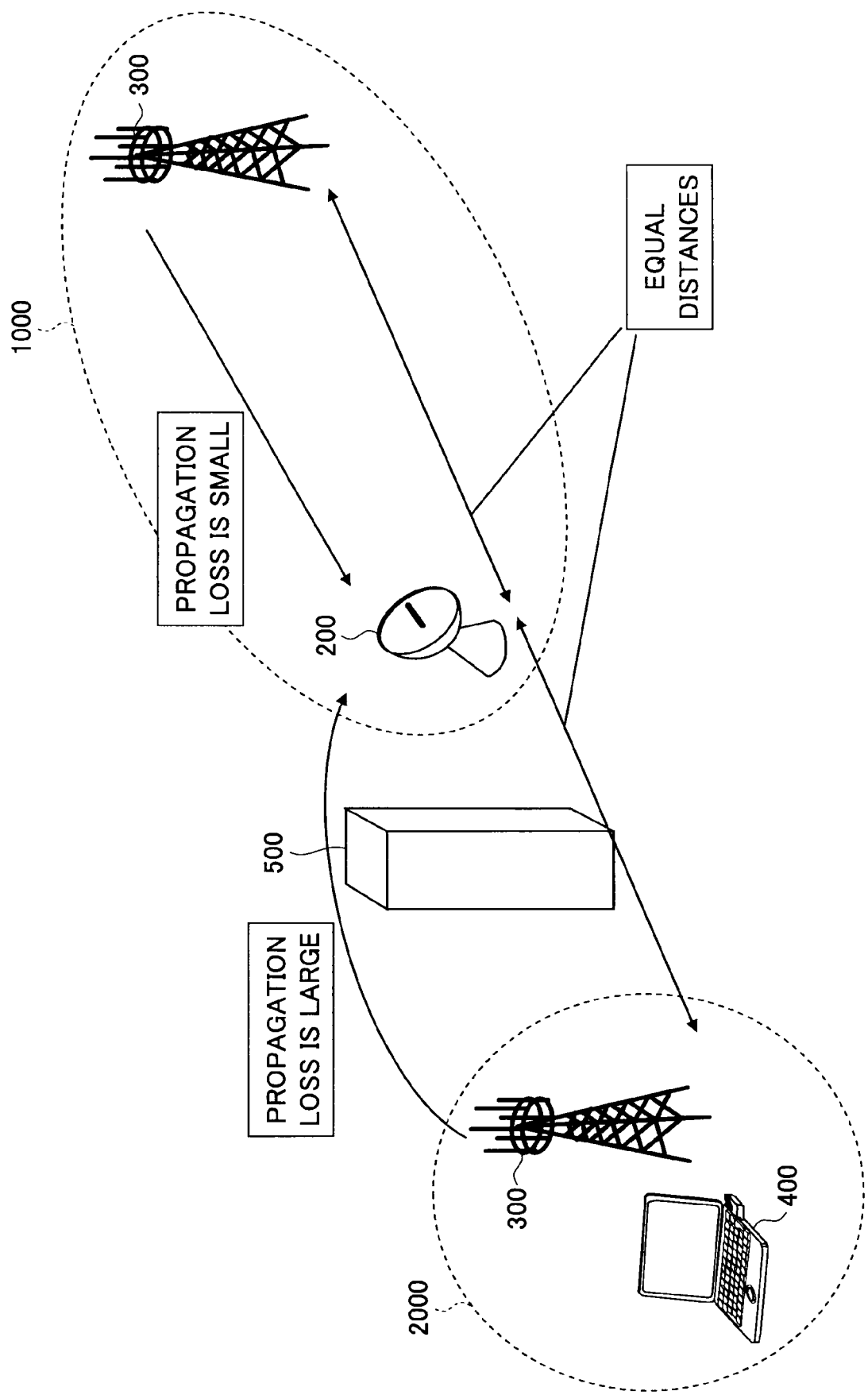
FIG. 7 is a drawing illustrating a communication environment where a wireless communication system according to an embodiment of the present invention is used.

In the first embodiment, the maximum transmission power is determined based on the distance between the receiving device 200 of the wireless communication system 1000 and the transmitting device of the base station 300 of the wireless communication system 2000. In practice, however, as shown in FIG. 7, the degree of influence exerted on the receiving device 200 of the wireless communication system 1000 by the transmitting device of the base station 300 of the wireless communication system 2000 varies greatly depending on, for example, the difference in height between the receiving device 200 and the transmitting device and the influence of a building 500.

Therefore, in this embodiment, correction values corresponding to locations and/or areas in a wireless communication system are calculated based on geographical conditions. The base station 300 of the wireless communication system 2000 of this embodiment calculates the maximum transmission power using a correction value corresponding to its location.

For example, the base station information storing unit 304 stores a correction value for the base station 300 and inputs the correction value to the maximum transmission power determining unit 306. The maximum transmission power determining unit 306 corrects the maximum transmission power by adding the correction value to the result of formula (3) described in the first embodiment and outputs the corrected maximum transmission power.

Meanwhile, in the first embodiment, it is assumed that the transmitting device of the base station 300 of the wireless communication system 2000 is located outdoors. The second embodiment may also be applied to a case where a transmitting device of a non-priority system, i.e., the wireless communication system 2000, is located indoors.

When the base station 300 of the wireless communication system 2000 is located indoors, the base station 300 exerts less influence on neighboring devices. In other words, a base station located indoors can transmit a signal with higher transmission power than a base station located outdoors even when their distances from a receiving device of a priority system are the same.

In this embodiment, the base station information storing unit 304 of the base station 300 of the wireless communication system 2000 stores location information of the base station 300. The location information includes information indicating whether the base station 300 is located outdoors or indoors. When the base station 300 is located, for example, in a room of a building, the location information may also include the material of the building, information indicating whether the room is a basement, information indicating whether the room has a window, and if the room has a window, the distance from the window. In this case, the base station information storing unit 304 stores a correction value corresponding to the location information and outputs the correction value to the maximum transmission power determining unit 306.

The maximum transmission power determining unit 306 corrects the maximum transmission power by adding the correction value to the result of formula (3) in the first embodiment and outputs the corrected maximum transmission power.

Third Embodiment

A wireless communication system according to a third embodiment of the present invention is described below.

The configuration of the wireless communication system of this embodiment is substantially the same as that described with reference to FIG. 2. Also, the configuration of the base station 300 of this embodiment is substantially the same as that described with reference to FIG. 4.

In the above embodiments, the maximum transmission power is determined based on the interference on the wireless communication system 1000 caused by a spurious signal.

However, there is a case where the influence of an out-of-band signal received by the receiving device 200 outside of the operating frequency band is greater than the influence of a spurious signal in the operating frequency band. Such influence by an out-of-band signal is called desensitization. The desensitization is a form of interference caused when a non-linear element of the receiving device 200 incorporates a received signal in a frequency band adjacent to the occupied frequency band into the frequency band of a desired signal. An example of the non-linear element is a received power amplifier.

The desensitization is generally determined by the level of total interference caused by received signals. To determine the maximum transmission power based on the desensitization, it is necessary to store an allowable interference level (desensitization level) in the priority system information storing unit 302 in addition to an allowable interference level (spurious signal level).

As with the allowable interference level (spurious signal level), the allowable interference level (desensitization level) differs depending on the frequency. Therefore, it is necessary to store the allowable interference level (desensitization level) for each frequency in the priority system information storing unit 302.

The maximum transmission power is obtained by the following formula (4) using the allowable interference level (desensitization level):

Maximum transmission power [dBm]=allowable interference level (desensitization level) [dBm]− estimated propagation loss [dB]−transmitting antenna gain [dB]−margin [dB] (4)

The maximum transmission power determining unit 306 compares the maximum transmission power obtained by formula (4) based on the desensitization level and the maximum transmission power obtained based on the spurious signal level as described in the above embodiments, and outputs the smaller maximum transmission power. More specifically, the maximum transmission power determining unit 306 compares the results of formulas (3) and (4) and outputs the smaller value as the maximum transmission power.

Fourth Embodiment

A wireless communication system according to a fourth embodiment of the present invention is described below.

The configuration of the wireless communication system of this embodiment is substantially the same as that described with reference to FIG. 2. Also, the configuration of the base station 300 of this embodiment is substantially the same as that described with reference to FIG. 4.

In the above embodiments, methods for obtaining the maximum transmission power of the base station 300 of the wireless communication system 2000 are described based on an assumption that the wireless communication systems 1000 and 2000 use the same frequency band and/or close (adjacent) frequency bands. In the methods, the maximum transmission power is determined based on the worst (maximum) value of the adjacent channel leakage power that is obtained, for example, based on a transmit spectrum mask.

However, the frequency waveform of an actual transmission signal varies depending on, for example, the capabilities, the number of subcarriers, and the transmission power of each transmitting device even in the same system. Accordingly, the adjacent channel leakage power varies from one transmitting device to another. Among the capabilities of a transmitting device, the capability of its transmission power amplifier especially influences the frequency waveform.

Figure 8:
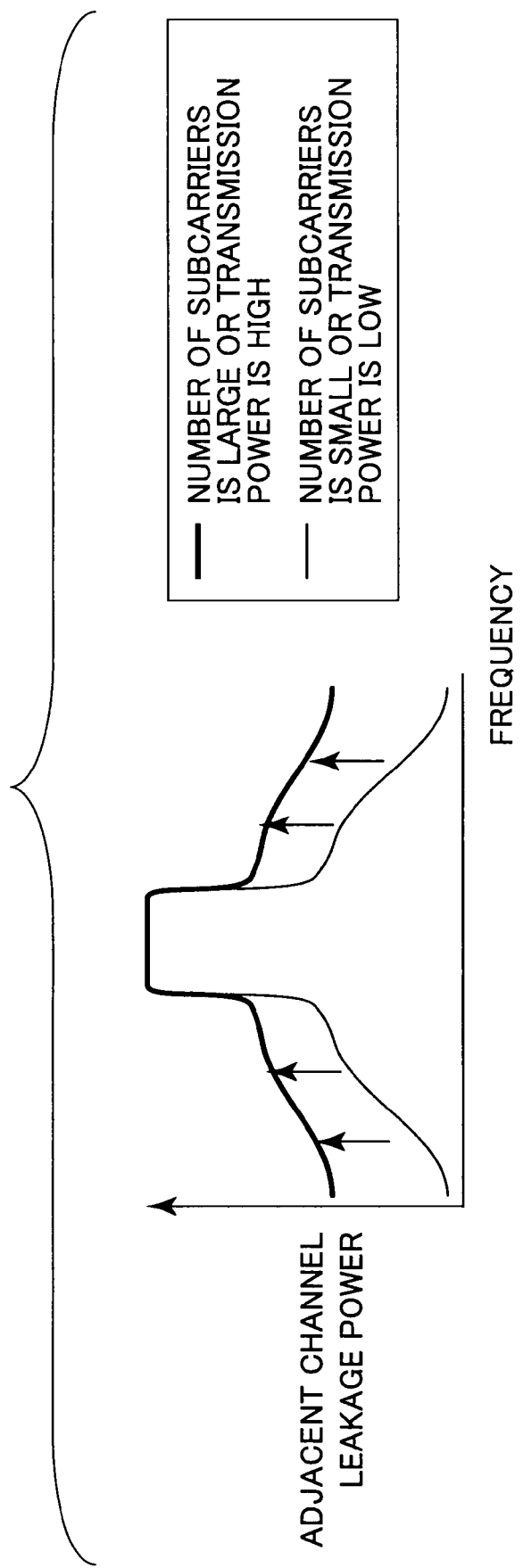
FIG. 8 is a drawing illustrating relationships between the number of subcarriers, transmission power, and adjacent channel leakage power.

Generally, as shown in FIG. 8, the adjacent channel leakage power increases as the number of subcarriers or the transmission power increases; and the adjacent channel leakage power decreases as the number of subcarriers or the transmission power decreases.

Therefore, the maximum transmission power may be determined based on the frequency waveform of a transmission signal which is determined by transmission conditions. The transmission conditions include adjacent channel leakage power characteristics, the number of subcarriers used, and transmission power of a transmitting device.

For example, when the maximum transmission power is determined based on the number of subcarriers used, the base station information storing unit 304 stores multiple combinations of adjacent channel leakage power characteristics and the numbers of subcarriers, and outputs the combinations to the maximum transmission power determining unit 306. The maximum transmission power determining unit 306 calculates maximum transmission power values for the respective numbers of subcarriers and inputs the calculated values to the transmission power control unit 308. For example, the maximum transmission power determining unit 306 calculates maximum transmission power values for the number of subcarriers X and the number of subcarriers Y.

The transmission control unit 308 selects an appropriate combination of the number of subcarriers and the maximum transmission power based on propagation loss, a requested transmission rate, and QoS of the mobile terminal 400 to which a signal is to be transmitted.

For example, when transmitting a signal at high transmission rate to the mobile terminal 400 sufficiently close to the base station 300, the transmission control unit 308 selects a combination of a large number of subcarriers and low maximum transmission power. On the other hand, when transmitting a signal at low transmission rate to the mobile terminal 400 far away from the base station 300, the transmission control unit 308 selects a combination of a small number of subcarriers and high maximum transmission power.

Fifth Embodiment

A wireless communication system according to a fifth embodiment of the present invention is described below.

The configuration of the wireless communication system of this embodiment is substantially the same as that described with reference to FIG. 2. Also, the configuration of the base station 300 of this embodiment is substantially the same as that described with reference to FIG. 4.

Figure 9:
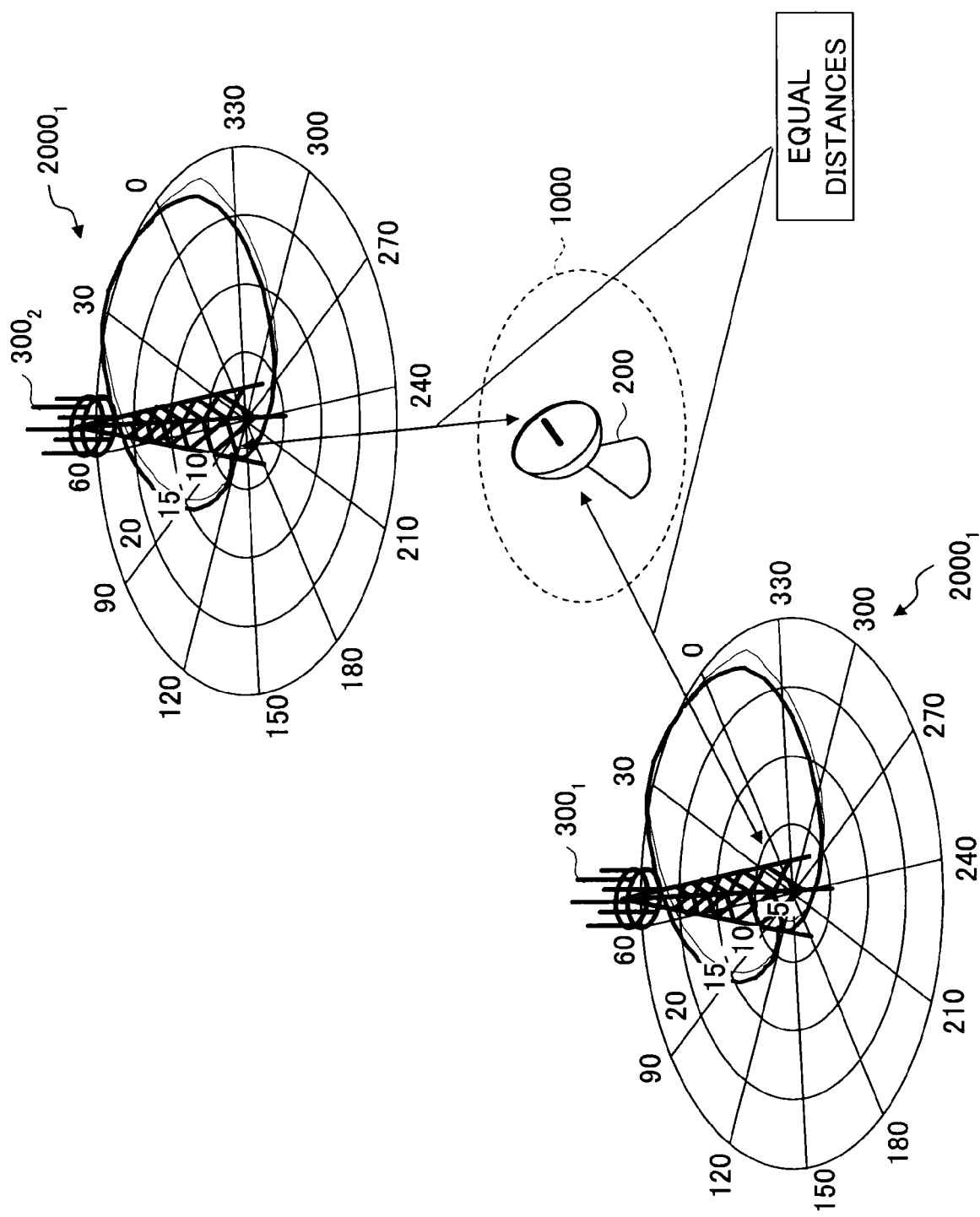
FIG. 9 is a drawing illustrating a communication environment where a wireless communication system according to an embodiment of the present invention is used.

As shown in FIG. 9, the degree of influence exerted on the receiving device 200 of the wireless communication system 1000 by the transmitting device of the base station 300 ($300_1$ or $300_2$) of the wireless communication system 2000 ($2000_1$ or $2000_2$) varies greatly depending on the directivity, such as horizontal directivity, of an antenna of the transmitting device and the direction of the receiving device 200 as seen from the transmitting device.

Therefore, in this embodiment, the base station information storing unit 304 stores information regarding the antenna directivity of the base station 300, and the maximum transmission power determining unit 306 uses the direction of the receiving device 200 as seen from the base station 300 as the receiving antenna gain. The information regarding the antenna directivity includes the main direction of a beam.

When the base station 300 covers multiple sectors, the antenna directivity may be represented by the sum of directivities of all the sectors.

This embodiment makes it possible to cover an area close to the receiving device 200 of the wireless communication system 1000 by the wireless communication system 2000 by adjusting the radiation pattern of an antenna. The radiation pattern may be adjusted, for example, by selecting an appropriate type of antenna and changing the direction of the antenna.

Figure 10:
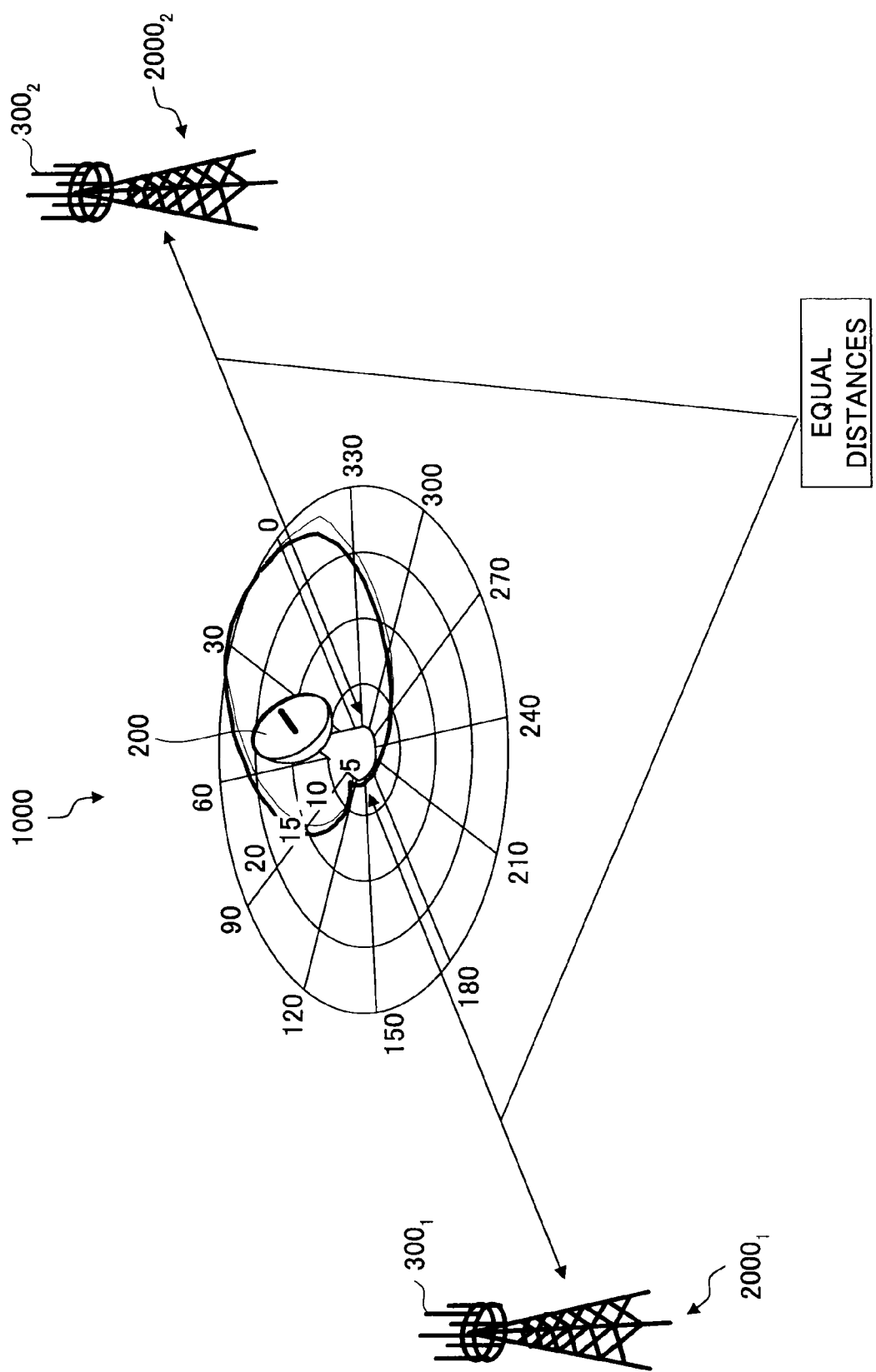
FIG. 10 is a drawing illustrating a communication environment where a wireless communication system according to an embodiment of the present invention is used.

In this embodiment, the maximum transmission power is determined based on the horizontal directivity of an antenna of the base station 300 of the wireless communication system 2000. Alternatively, as shown in FIG. 10, the maximum transmission power may be determined based on receiving antenna directivity of the receiving device 200 of the wireless communication system 1000. In this case, the priority system information storing unit 302 stores information regarding antenna directivity of the receiving device 200 of the wireless communication system 1000 (i.e., the priority system); and the direction of the base station 300 of the wireless communication system 2000 as seen from the receiving device 200 of the priority system is used as the transmitting antenna gain in formula (2) for obtaining the maximum transmission power density. The information regarding the antenna directivity includes the main direction of a beam.

Also, the maximum transmission power may be determined based on the vertical directivity of an antenna of the base station 300 instead of the horizontal directivity. Further, the maximum transmission power may be determined based on the horizontal directivity and the vertical directivity of an antenna of the base station 300. When the maximum transmission power is calculated based on the vertical directivity, the antenna gain used in the calculation is obtained based on the elevation angle from the base station 300 of the wireless communication system 2000 to the receiving device 200 of the wireless communication system 1000. Therefore, in this case, it is necessary to store the heights at which the antennas of the base station 300 and the receiving device 200 are located in the base station information storing unit 304 and the priority system information storing unit 302, respectively. The height of an antenna is represented, for example, by the sum of the ground height and the height of an antenna building.

Sixth Embodiment

A wireless communication system according to a sixth embodiment of the present invention is described below.

In the above embodiments, the priority system information in the priority system information storing unit 302 is either statically stored or updated as needed via a wired network. In this embodiment, the priority system information in the priority system information storing unit 302 is updated using a radio signal.

The configuration of the wireless communication system of this embodiment is substantially the same as that described with reference to FIG. 2.

Figure 11:
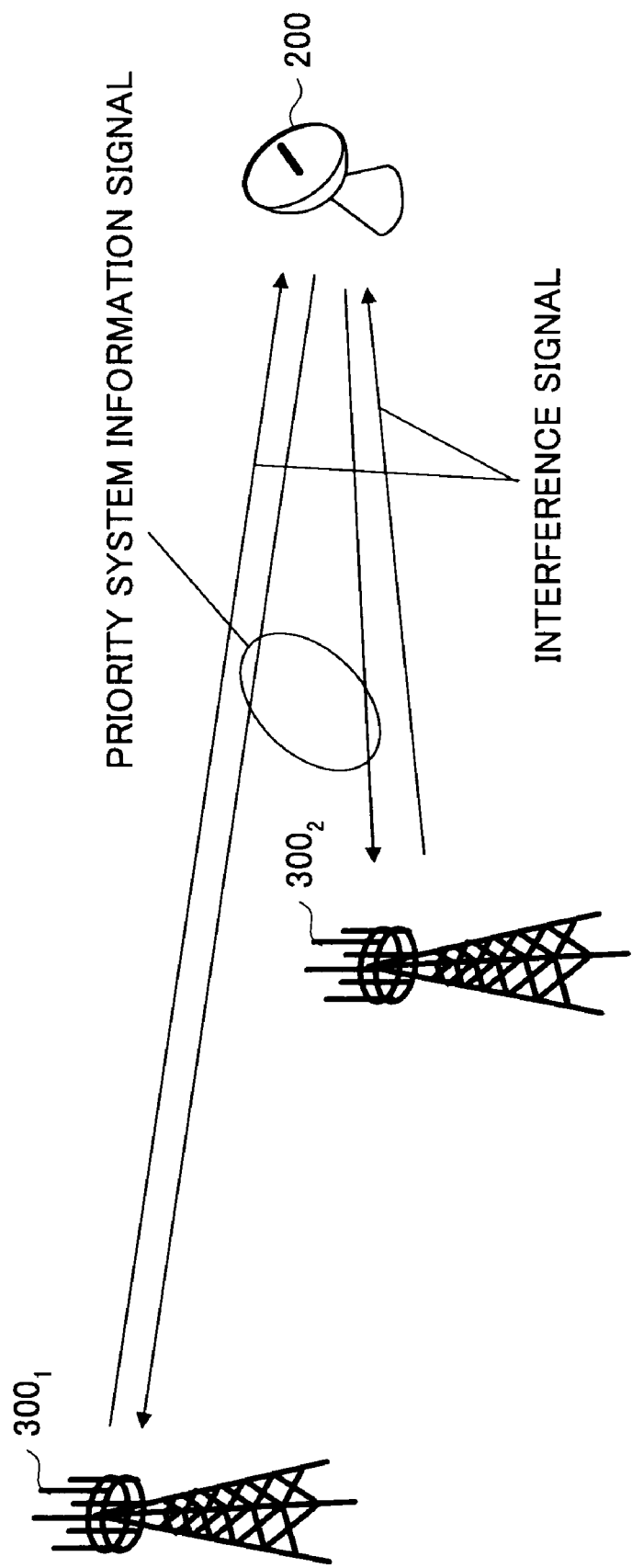
FIG. 11 is a drawing illustrating a communication environment where a wireless communication system according to an embodiment of the present invention is used.

In this embodiment, as shown in FIG. 11, the receiving device 200 of the wireless communication system 1000 (i.e., the priority system) sends priority system information to the base stations 300 ($300_1$ and $300_2$) of the wireless communication system 2000. When receiving the priority system information from the receiving device 200, each of the base stations 300 updates the priority system information in the priority system information storing unit 302. Preferably, the priority system information is transmitted using a frequency band other than the frequency bands used for communications in the respective wireless communication systems 1000 and 2000.

Figure 12:
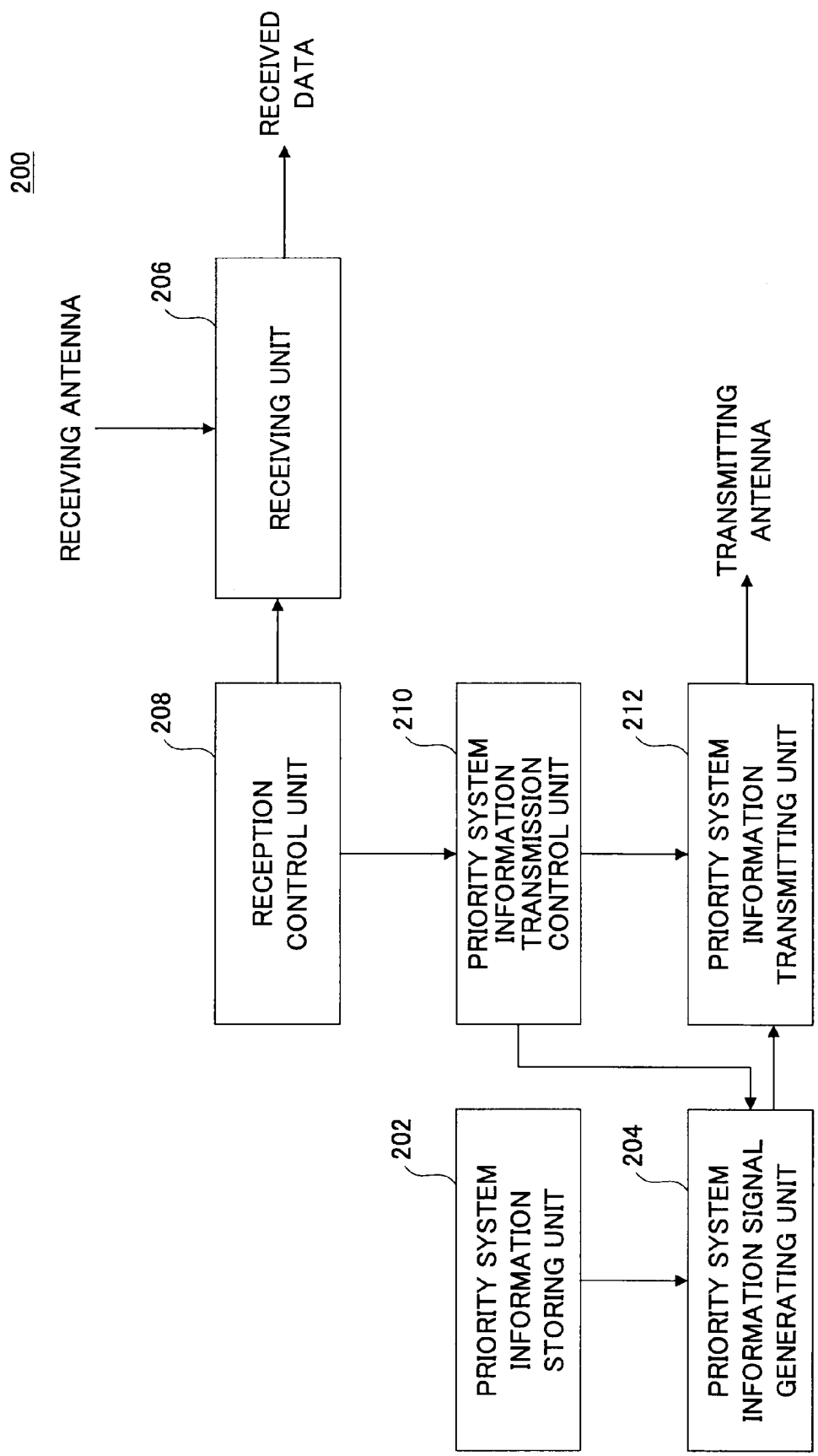
FIG. 12 is a partial block diagram illustrating a receiving device according to an embodiment of the present invention.

The receiving device 200 of this embodiment is described below with reference to FIG. 12.

The receiving device 200 of this embodiment includes a priority system information storing unit 202, a priority system information signal generating unit 204, a receiving unit 206, a reception control unit 208, a priority system information transmission control unit 210, and a priority system information transmitting unit 212.

The reception control unit 208 controls reception of desired signals by the receiving device 200 of the priority system. The reception control unit 208 reports reception conditions to the priority system information transmission control unit 210 in preference to other information.

The priority system information storing unit 202 stores priority system information and outputs the priority system information to the priority system information signal generating unit 204. The priority system information includes an allowable interference level and transmission power of the priority system information.

The priority system information signal generating unit 204 generates a priority system information signal based on the priority system information input from the priority system information storing unit 202. The priority system information signal generating unit 204 may also be configured to generate a frequency restriction signal for restricting the use of a specified frequency band. The frequency restriction signal includes information indicating an occupied frequency band (or occupied bandwidth) of the wireless communication system 1000 and transmission power (effective isotropically radiated power: EIRP) of the frequency restriction signal. The frequency restriction signal may also include an allowable interference level of the wireless communication system 1000.

The priority system information transmitting unit 212 transmits the priority system information signal and/or the frequency restriction signal under the control of the priority system information transmission control unit 210.

The priority system information transmission control unit 210 determines whether it is necessary to transmit the priority system information signal and/or the frequency restriction signal based on the reception conditions reported by the reception control unit 208. If it is determined that it is necessary to transmit the priority system information signal and/or the frequency restriction signal, the priority system information transmission control unit 210 sends a signal requesting the priority system information transmitting unit 212 to transmit the priority system information signal and/or the frequency restriction signal. The priority system information transmission control unit 210 may also be configured to send information indicating the time left before the next reception of a signal.

An exemplary format of the priority system information signal is described below with reference to FIG. 13.

The priority system information signal includes the following four fields: a preamble, operating frequency information, a transmission power value, and an allowable interference level.

The preamble is a known signal pattern and is used at a receiving end for synchronization and channel estimation. For example, the base station 300 of the wireless communication system 2000 performs synchronization and channel estimation based on the preamble.

The operating frequency information includes a frequency band (or bandwidth) and a center frequency used for reception of signals in the priority system.

The transmission power value indicates the transmission power of the priority system information signal and is preferably determined taking into account the transmitting antenna gain. Also, the transmission power value is preferably set at a low value to prevent the propagation loss estimated by some base stations from becoming too large because of the antenna directivity.

The allowable interference level indicates an interference level that can be tolerated by the receiving device 200 of the priority system.

In this embodiment, the reception control unit 208 reports reception conditions of signals in the priority system to the priority system information transmission control unit 210 and the priority system information transmission control unit 210 controls transmission of the priority system information signal based on the reception conditions. Alternatively, the receiving device 200 may be configured to transmit the priority system information signal regardless of the reception conditions. This alternative configuration reduces the workload and/or costs to modify the priority system. However, with the alternative configuration, it is not possible to efficiently use the time when the priority system is not receiving signals and therefore it becomes difficult to improve the frequency efficiency.

Also, when priority system information signals are transmitted from receiving devices of multiple priority systems, the priority system information signals may be spread by spreading codes. This makes it possible for the base station 300 to distinguish the respective priority system information signals and to determine their reception levels. Also, an interference avoidance technology such as carrier sense multiple access (CSMA) may be used. In CSMA, a transmitting device determines, before transmitting a signal, whether an interference report signal is being transmitted by a neighboring device. If an interference report signal is being transmitted by a neighboring device, the transmitting device delays transmission of its own interference report signal and waits for the next transmission timing. On the other hand, if no interference report signal is being transmitted, the transmitting device transmits its own interference report signal.

Figure 14:
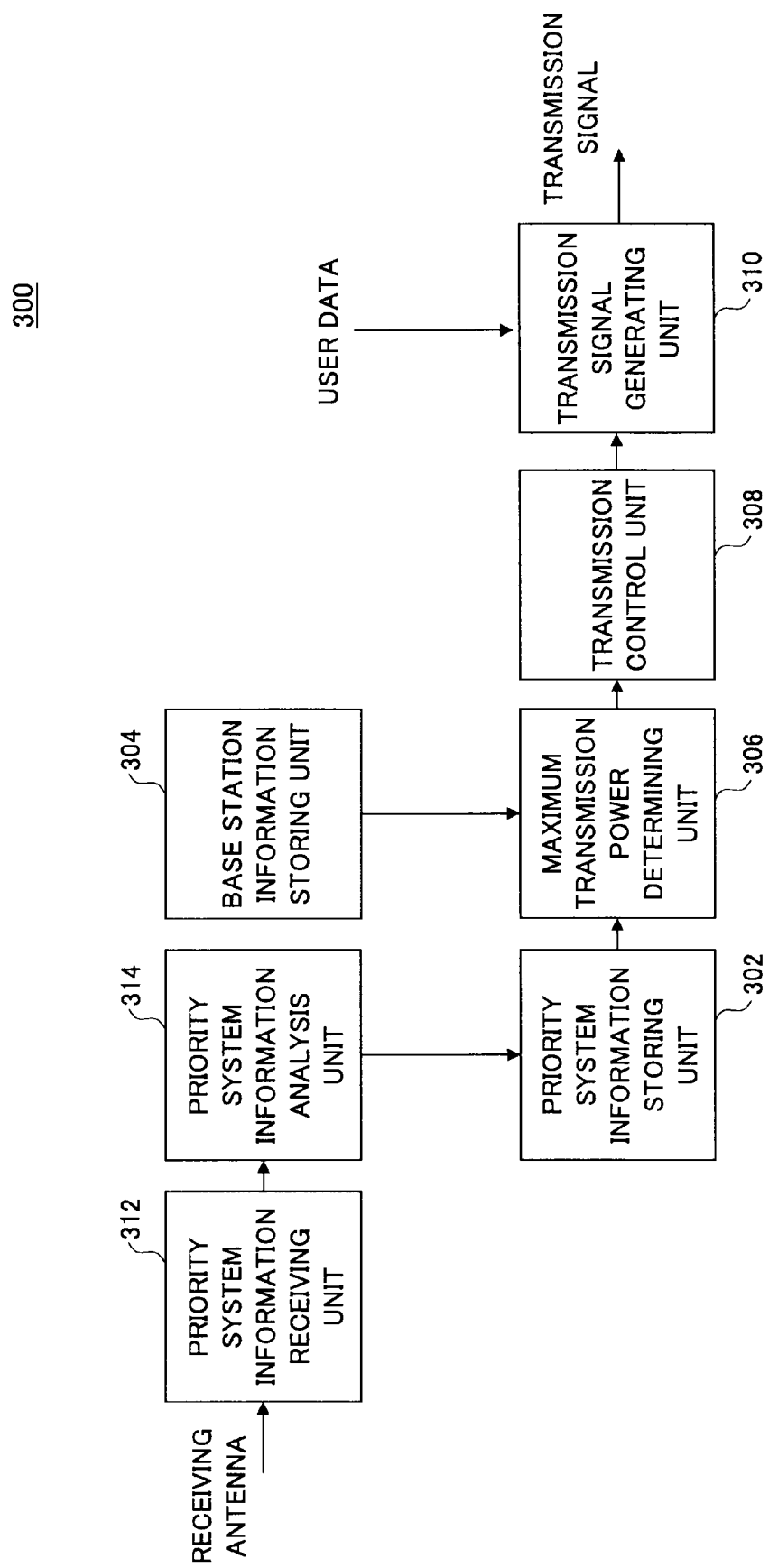
FIG. 14 is a partial block diagram illustrating a base station according to an embodiment of the present invention.

The base station 300 of the wireless communication system 2000 according to this embodiment is described below with reference to FIG. 14.

Figure 4:
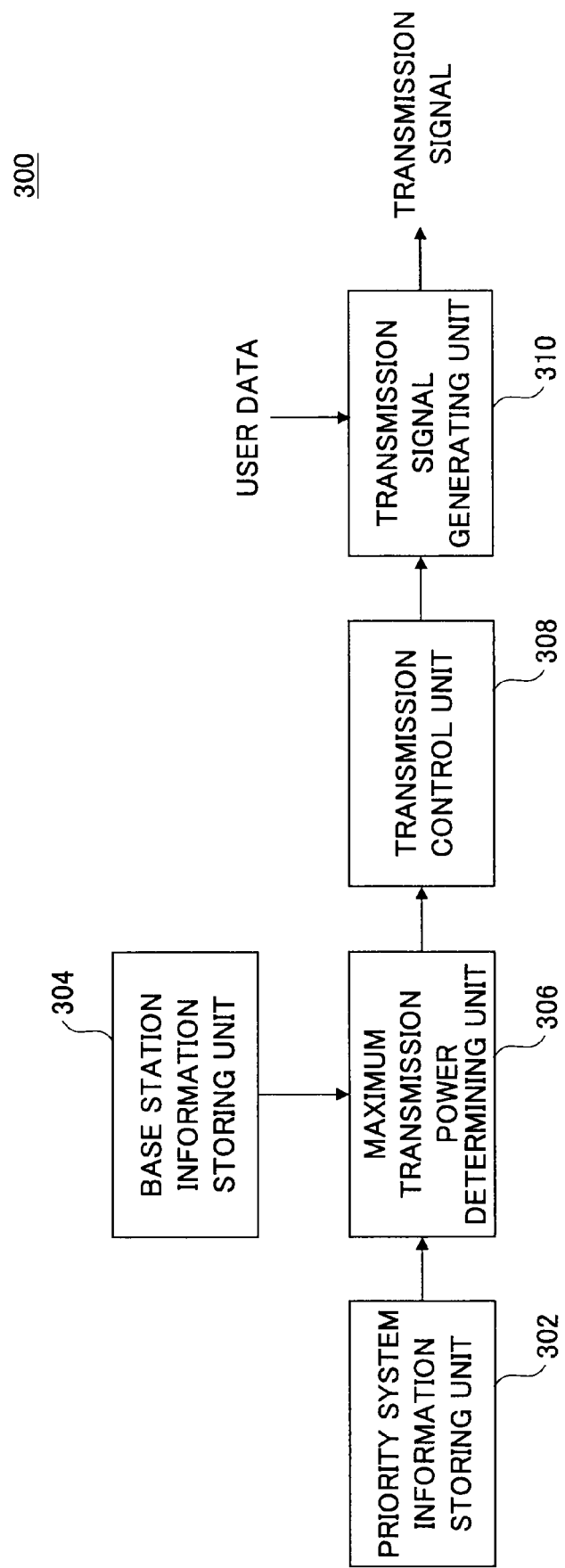
FIG. 4 is a partial block diagram illustrating a base station according to an embodiment of the present invention.

The base station 300 of this embodiment includes a priority system information receiving unit 312 and a priority system information analysis unit 314 in addition to components shown in FIG. 4. In this embodiment, the priority system information analysis unit 314 may also function as a propagation loss estimation unit.

The priority system information receiving unit 312 receives the priority system information signal and/or the frequency restriction signal from the receiving device 200 of the wireless communication system 1000 (i.e., the priority system), measures the reception levels of the priority system information signal and/or the frequency restriction signal, and extracts data from the priority system information signal and/or the frequency restriction signal. Then, the priority system information receiving unit 312 sends the reception levels and data of the priority system information signal and/or the frequency restriction signal to the priority system information analysis unit 314.

The priority system information analysis unit 314 estimates propagation loss between the base station 300 and an interfered node, i.e., the receiving device 200, based on the reception level of the priority system information signal and the transmission power value (effective isotropic radiated power: EIRP) in the priority system information input from the priority system information receiving unit 312. In estimating propagation loss, if the frequency band used to transmit the priority system information and the frequency band used for actual communications differ greatly, it is necessary to correct the estimated propagation loss.

The propagation loss may be corrected, for example, by one of the following two methods:

Method 1:

A table containing correction values for respective frequency bands is prepared and a correction value for correcting the propagation loss is selected from the table according to the frequency band used to transmit the priority system information.

Method 2:

A distance between the base station 300 and the receiving device 200 is calculated based on free-space propagation loss, the frequency band used to transmit the priority system information, and the reception level. Then, the propagation loss is calculated based on the frequency band used for actual communications and the calculated distance.

The priority system information analysis unit 314 also estimates the distance between the base station 300 and the receiving device 200 based on the reception level of the frequency restriction signal and the transmission power value in the frequency restriction signal input from the priority system information receiving unit 312.

Further, the priority system information analysis unit 314 retains the time when the priority system information is received. Based on the retained time, the base station 300 continues using the received data for a predetermined period of time (data expiration time) after receiving the priority system information unless the priority system information is updated. For example, the data expiration time may be included in the priority system information.

This embodiment makes it possible to more efficiently use frequencies according to operating conditions of the receiving device 200 of the wireless communication system 1000. This embodiment may also be applied to a case where the receiving device 200 of the wireless communication system 1000 is a mobile device. This embodiment does not require a wired network and therefore makes it possible to simplify the configuration of a system. Further, this embodiment makes it possible to automatically calculate geographical parameters and thereby eliminates the need to obtain such geographical parameters in advance.

Seventh Embodiment

A wireless communication system according to a seventh embodiment of the present invention is described below.

The configuration of the wireless communication system of this embodiment is substantially the same as that described with reference to FIG. 2.

The above embodiments are applied to an environment where the base station 300 of the wireless communication system 2000 uses, for downlink communications, the same frequency band as and/or a frequency band close (adjacent) to that used by the priority system.

This embodiment relates to a method for preventing interference by uplink signals of the wireless communication system 2000 with a priority system. In this embodiment, it is assumed that downlink signals of the wireless communication system 2000 do not interfere with the priority system.

The base station 300 of this embodiment determines the maximum transmission power for mobile terminals in its cell (or its coverage area) and broadcasts the maximum transmission power value to the mobile terminals.

Figure 15:
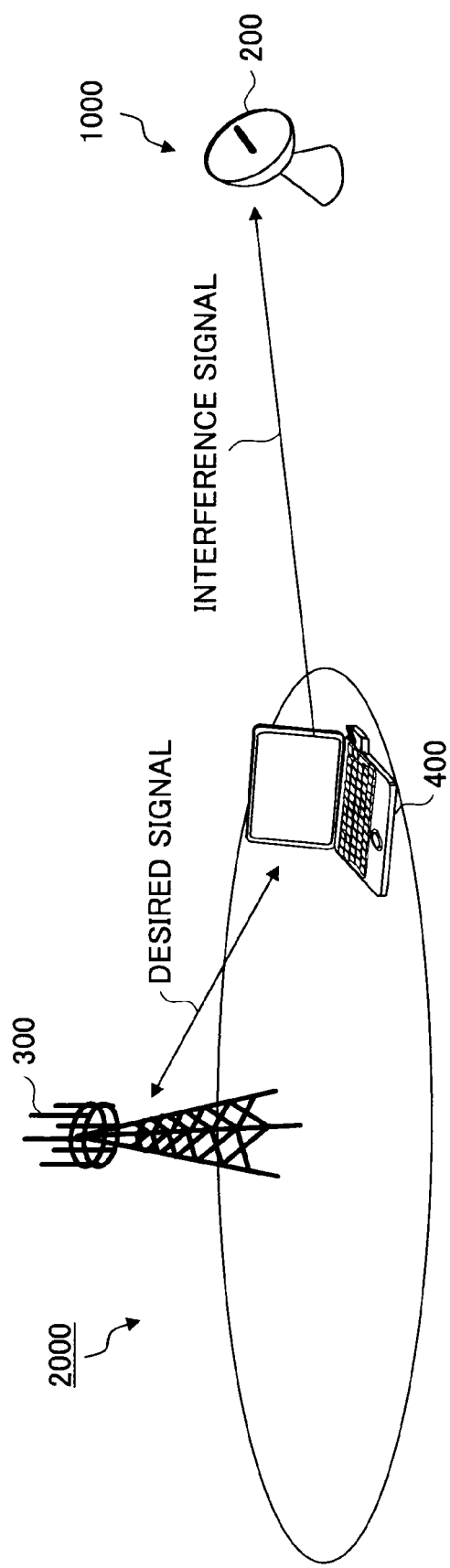
FIG. 15 is a drawing illustrating a communication environment where a wireless communication system according to an embodiment of the present invention is used.

FIG. 15 is a drawing illustrating a communication environment where a wireless communication system of this embodiment is used.

To prevent interference caused by uplink signals, it is necessary for the base station 300 of the wireless communication system 2000 to take into account the distance between the receiving device 200 of the wireless communication system 1000 (the priority system) and a mobile terminal that is farthest from the base station 300 in its coverage area (closest to the receiving device 200).

In this case, the maximum transmission power determining unit 306 of the base station 300 determines the maximum transmission power of the mobile terminal 400 by the following formula (5):

Maximum transmission power=allowable interference level (spurious signal level)+adjacent channel leakage power ratio−estimated propagation loss−transmitting antenna gain−margin (5)

In formula (5), the adjacent channel leakage power ratio and the transmitting antenna gain are characteristics of the mobile terminal 400. Also, the estimated propagation loss indicates the propagation loss between the receiving device 200 (i.e., an interfered node) and the mobile terminal 400 farthest from the base station 300 and is used for all mobile stations in the cell. In other words, the estimated propagation loss indicates the propagation loss between an interfered node and a point that is in the coverage area of the base station 300 of the wireless communication system 2000 and is closest to the interfered node. Therefore, the estimated propagation loss can be calculated based on a value obtained by subtracting the maximum radius of the coverage area of the base station 300 from the distance between the base station 300 and the interfered node.

In the next example described below, the base station 300 determines maximum transmission power values for respective mobile terminals that are ready to send and receive control signals to and from the base station 300.

To calculate the maximum transmission power for each mobile terminal 400, it is necessary to estimate the propagation loss between the mobile terminal 400 and the interfered node. Also, to estimate the propagation loss, it is necessary to determine the location of the mobile terminal 400 and thereby to obtain the distance between the mobile terminal 400 and the interfered node. In a case where the mobile terminal 400 includes a global positioning system (GPS) and is able to correctly determine its location, the base station 300 may be configured to estimate the propagation loss based on location information reported by the mobile terminal 400. In a case where the mobile terminal 400 is unable to determine its location, the base station 300 may be configured to estimate the propagation loss using a point that is farthest from the base station 300 in its coverage area (closest to the receiving device 200) as the location of the mobile terminal 400. Also, the base station 300 may be configured to estimate the distance between the mobile terminal 400 and the base station 300 based on the level of a received signal from the mobile terminal 400 and the transmission power of the mobile terminal 400, and to assume that the mobile terminal 400 is away from the base station 300 by the estimated distance in the direction of the interfered node.

The base station 300 estimates propagation loss based on the determined location of each mobile terminal 400, calculates maximum transmission power using formula (5), and reports the maximum transmission power to the mobile terminal 400.

Eighth Embodiment

A wireless communication system according to an eighth embodiment of the present invention is described below.

The configuration of the wireless communication system of this embodiment is substantially the same as that described with reference to FIG. 2.

Figure 16:
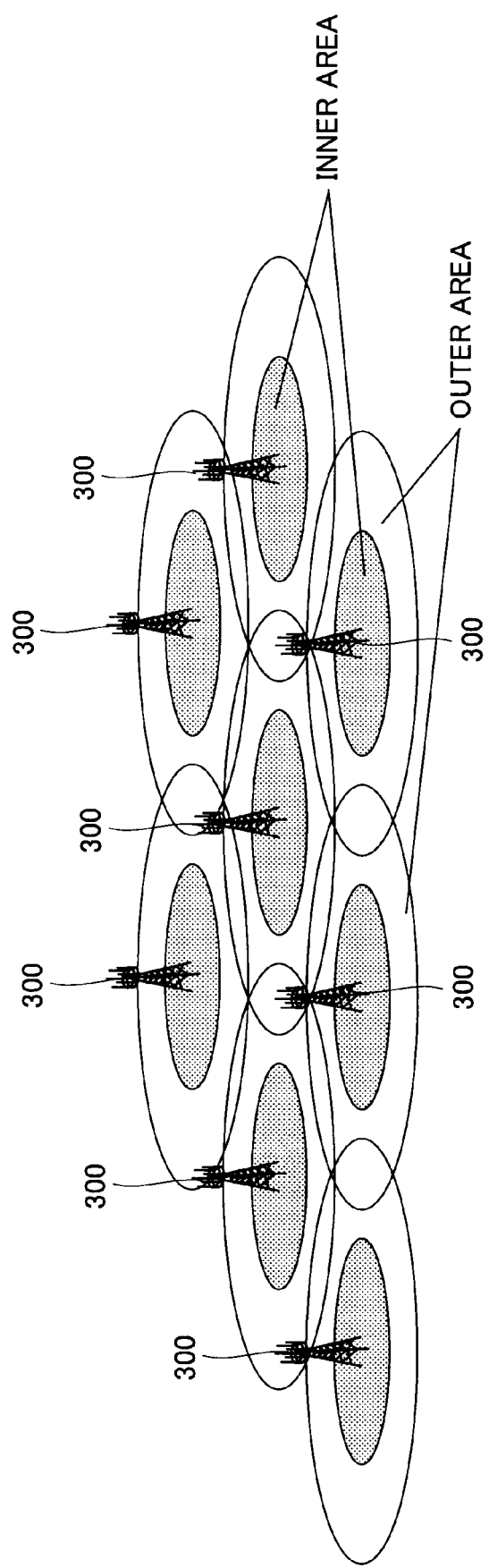
FIG. 16 is a drawing used to describe a fractional reuse scheme in OFDM.

"Fractional reuse" in OFDM is known as a scheme for securing a wide coverage area and high capacity when deploying a wireless communication system in a wide area. FIG. 16 is a drawing used to describe the fractional reuse scheme in OFDM. In the fractional reuse scheme, assuming that frequency bands X and Y are available, the number of subcarriers used for each of the frequency bands X and Y is determined and different subcarrier sets are allocated to respective cells. With this scheme, although the maximum throughput of each cell decreases, it is possible to reduce interference with other cells. In other words, this scheme makes it possible to reduce interference from other cells. In the fractional reuse scheme, each cell is divided, for example, into an outer area and an inner area. In the inner area, all available subcarriers are used; and in the outer area, only a part of the subcarriers are used. For example, the usage rate of subcarriers in the outer area is set at one third.

There are several methods to divide a cell into inner and outer areas and to allocate different frequency bands to the inner and outer areas. For example, the base station may be configured to allocate different sets of subcarriers or subchannels in certain frequency bands to the inner and outer areas of a cell and to use different transmission power levels for the respective frequency bands to control the range of transmitted waves in the cell. As another example, the base station may be equipped with multiple antennas with different tilt angles that correspond to the inner and outer areas. The ratio of the radius of the inner area to the radius of the outer area may be predetermined (e.g., 1:2). Alternatively, the ratio of the radius of the inner area to the radius of the outer area may be changed dynamically according to changes in communication environments by adjusting the transmission power levels or the tilt angles of antennas.

Figure 17:
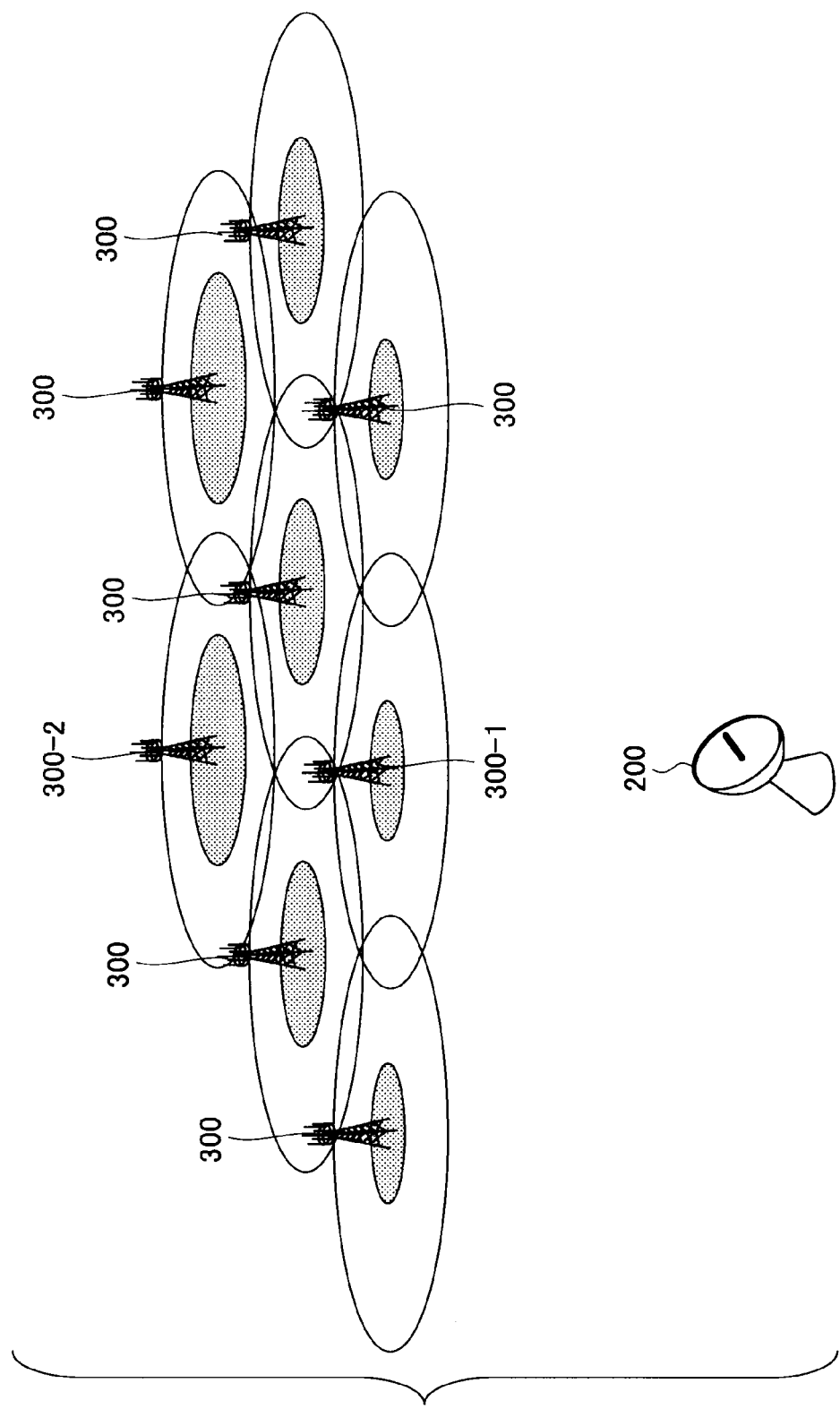
FIG. 17 is a drawing used to describe a fractional reuse scheme where transmission power is restricted by a priority system.

Based on the above scheme, in the wireless communication system of this embodiment, the base station transmits signals using the frequency band X with a high usage rate to users close to the base station. Because of the geographical advantage, the received signal levels of users close to the base station are high and the levels of interference signals from other cells to the users are low. As shown in FIG. 17, inner areas or inner coverage areas become small because transmission power in the inner areas is restricted to a low level (the level of transmission power restriction is high) by a priority system. However, in inner areas, it possible to repeatedly use the same frequency band at short (distance) intervals and therefore it is possible to improve the frequency efficiency. In other words, it is possible to achieve high system capacity.

On the other hand, the base station transmits signals using the frequency band Y with a low usage rate to users away from the base station. Transmitting signals with a low frequency usage rate makes it possible to reduce intercell interference even at a cell edge and also makes it possible to secure a wide coverage area.

In this embodiment, when the use of some frequency bands is restricted because of the presence of a priority system, those frequency bands are allocated to users close to the base station. In other words, restricted subcarriers in a frequency band that is the same as or close to that of a priority system are used in the inner area, and non-restricted subcarriers in a frequency band that is different from and not close to that of the priority system are used in the outer area. Preferably, the same restrictions on transmission conditions are applied to multiple base stations located close to each other. Also, the same frequency allocation method is preferably used throughout a system or at least in each region.

The above allocation method makes it possible to achieve "fractional reuse" based on restrictions imposed by a priority system and thereby makes it possible to improve the throughput of a wireless communication system. In other words, the above method makes it possible to maintain a wide coverage area as well as to achieve high capacity even when the use of some frequency bands is restricted to prevent interference with a priority system.

In the above embodiment, transmission power is restricted in relation to a priority system. Therefore, the transmission power used in the inner area may vary from cell to cell. Meanwhile, the amount of traffic in each cell is determined by requests from users in the cell, and the distribution of traffic (transmission requests from users in the inner area and transmission requests from users in the outer area) changes dynamically. Therefore, the ratio of frequency bands (or bandwidth) on which a transmission power restriction is imposed to frequency bands (or bandwidth) on which no transmission power restriction is imposed does not always match the distribution of traffic.

To solve or reduce this problem, it is necessary to control the frequency usage rate and/or the frequency band allocation according to the distribution of traffic and/or the level of transmission power restriction.

An exemplary method of controlling the frequency usage rate and/or the frequency band allocation is described below.

In FIG. 17, a base station 300-1 is close to the receiving device 200 of the priority system and therefore the level of transmission power restriction is high (transmission power is restricted to a low level). On the other hand, a base station 300-2 is away from the receiving device 200 of the priority system and therefore the level of transmission power restriction is low (high transmission power may be used). For example, when the traffic of the base stations 300-1 and 300-2 is substantially the same, the channel usage rate of a signal transmitted from the base station 300-1 is set at a high value and the channel usage rate of a signal transmitted from the base station 300-2 is set at a low value.

Also, the subcarrier usage rates for the inner area and the outer area may be determined taking into account the amounts of traffic in cells. For example, high subcarrier usage rates are used for a cell with a large amount of traffic and low subcarrier usage rates are used for a cell with a small amount of traffic.

Further, frequency bands may be allocated to the inner and outer areas of a cell taking into account the distribution of traffic.

For example, a part of a restricted frequency band that is the same as or close to that of the priority system may also be allocated to the outer area according to the distribution of traffic. Also, a part of a non-restricted frequency band that is different from and not close to that of the priority system may also be allocated to the inner area according to the distribution of traffic. Allocation of resources to the inner area and the outer area may also be determined based on the geographical distribution of users (or distribution of reception quality (signal-to-interference-plus-noise ratio: SINR) of users) in a cell and neighboring cells.

In the above method, whether a user (mobile terminal) belongs to the inner area or the outer area may be determined based on the propagation loss between the base station and the mobile terminal instead of the geographical location of the mobile terminal.

Also in the above method, resources allocated to the inner area may be used with a high subcarrier usage rate and resources allocated to the outer area may be used with a low subcarrier usage rate.

In the above embodiments, transmission power is determined by the base station 300 of the wireless communication system 2000. Alternatively, transmission power may be determined by the mobile terminal 400. In this case, however, it is necessary to determine the location of the mobile terminal 400 using, for example, a GPS to take into account the movement of the mobile terminal 400.

Figure 18:
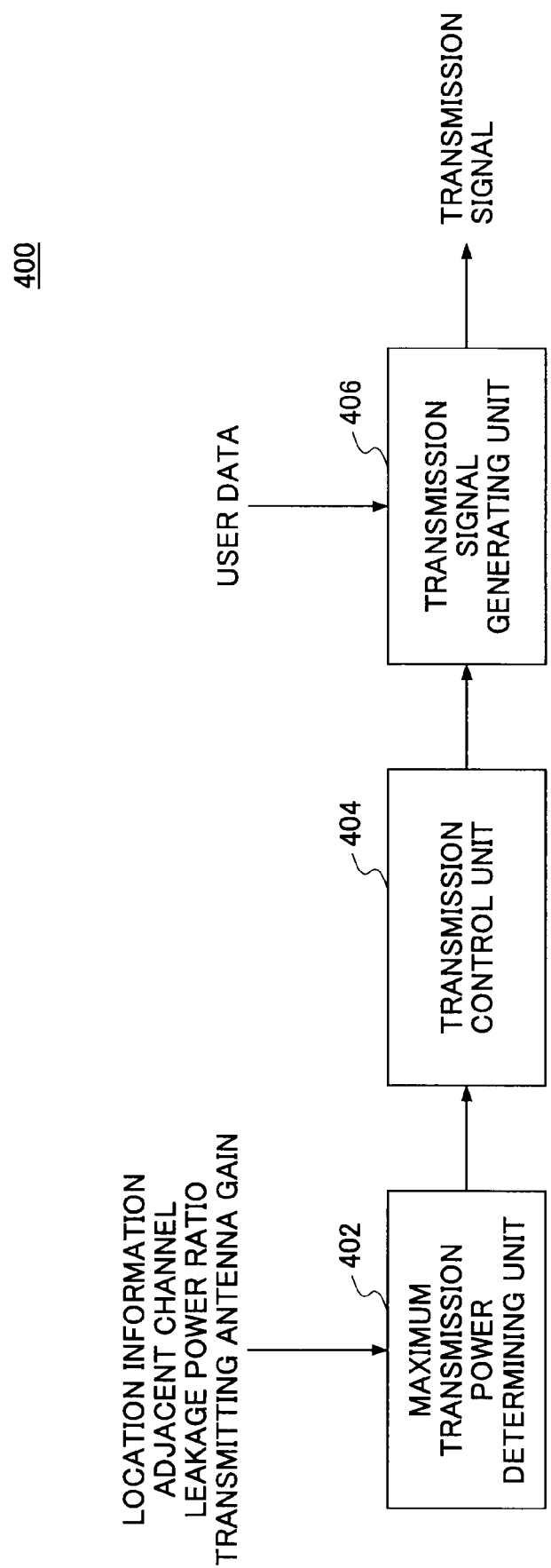
FIG. 18 is a partial block diagram illustrating a mobile terminal according to an embodiment of the present invention.

FIG. 18 shows the mobile station 400 that is configured to determine transmission power.

The mobile terminal 400 includes a maximum transmission power determining unit 402 that may be used as a frequency difference calculation unit, a distance calculation unit, and a maximum transmission power determining unit; a transmission control unit 404; and a transmission signal generating unit 406.

The maximum transmission power determining unit 402 receives location information of the mobile terminal 400, determines the distance between the mobile terminal 400 and an interfered node (e.g., the receiving device 200 of the wireless communication system 1000) based on the location information, and estimates propagation loss based on the distance. Then, the maximum transmission power determining unit 402 obtains the maximum transmission power using formula (5) described above based on the estimated propagation loss, an adjacent channel leakage power ratio and transmitting antenna gain of the mobile terminal 400, and an allowable interference level (spurious signal level).

The transmission control unit 404 performs transmission control such that signals are transmitted with transmission power less than or equal to the maximum transmission power determined by the maximum transmission power determining unit 402.

The transmission signal generating unit 406 generates a transmission signal. The transmission signal includes user data. The transmission signal generating unit 406 transmits the generated transmission signal under the control of the transmission control unit 404 with transmission power less than or equal to the maximum transmission power determined by the maximum transmission power determining unit 402.

When the mobile terminal 400 is in a building and is not able to determine its location, the mobile terminal 400, for example, determines the closest base station based on location information sent from multiple base stations and uses the location of the closest base station as the location of itself. In this case, because the accuracy of the determined location of the mobile terminal 400 is low, the maximum transmission power determining unit 402 may be configured to increase a margin of the estimated propagation loss.

Meanwhile, in some systems, multiple frequency bands are allocated to each base station and the base station is configured to select one of the frequency bands for each communication. If the above embodiment is to be applied to such systems, it is necessary to configure the mobile terminal 400 to be able to select a frequency band used for communications. In this case, the mobile terminal 400 may also be configured to be able to specify an "Any" option indicating that the mobile terminal 400 accepts any frequency band.

Also, when different frequency bands are used by multiple base stations 300, the mobile terminal 400 may be configured to select and communicate with one of the base stations 300 to which a signal can be transmitted with the determined transmission power. When the transmission power of base stations is the same, it is normal for the mobile terminal 400 to select a base station providing the highest received power. However, the mobile terminal 400 may instead be configured to select a base station that provides low received power but has high maximum transmission power.

In this embodiment, the priority system information may be either broadcast from base stations of the non-priority system or transmitted wirelessly from the priority system.

The maximum transmission power in the above embodiments may be determined according to the tilt angle of an antenna. Also, the tilt angle of an antenna may be determined based on other conditions. Assume that an antenna of the wireless communication system 2000 can take two tilt angles: tilt angle 1 and tilt angle 2. In this case, for example, maximum transmission power X [dB] is calculated for tilt angle 1 and maximum transmission power Y [dB] is calculated for tilt angle 2 according to any one of the methods described above (vertical directivity may also be taken into account in the calculations), and combinations of the tilt angles and the calculated maximum transmission power values are input to the transmission control unit 308. The transmission control unit 308 selects an appropriate combination of the tilt angle and the maximum transmission power based on propagation loss, a requested transmission rate, and QoS of the mobile terminal 400 to which a signal is to be transmitted.

Figure 19:
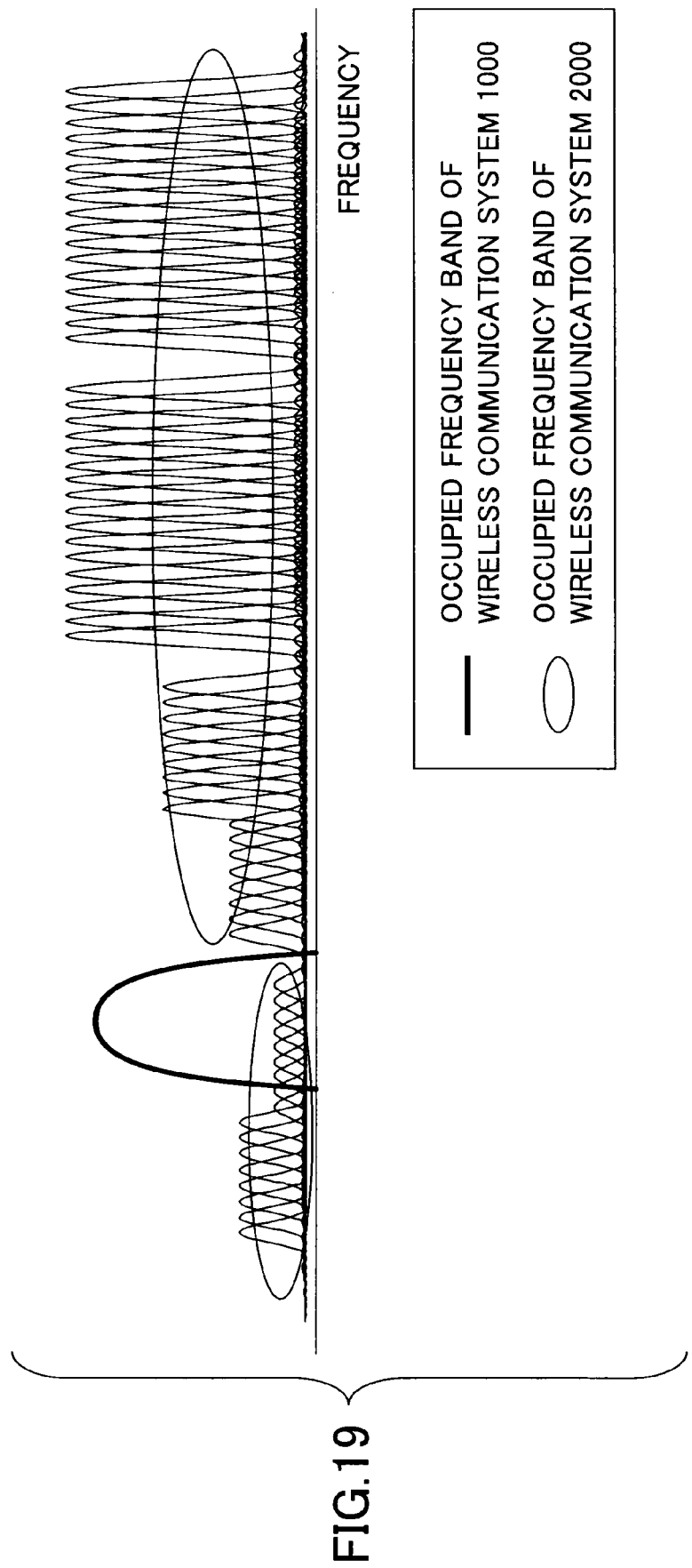
FIG. 19 is a drawing illustrating an exemplary occupied frequency band of a wireless communication system according to an embodiment of the present invention.

In the above embodiments, the maximum transmission power is determined for the entire frequency band allocated to the wireless communication system 2000. Meanwhile, in a system using a multi-carrier signal as in OFDM, the maximum transmission power may be determined, as shown in FIG. 19, for each subcarrier block composed of consecutive subcarriers.

Also in this case, influence on the priority system may be controlled by assigning the same transmission power to the respective subcarriers and by changing the number of subcarriers to be used.

Figure 20:
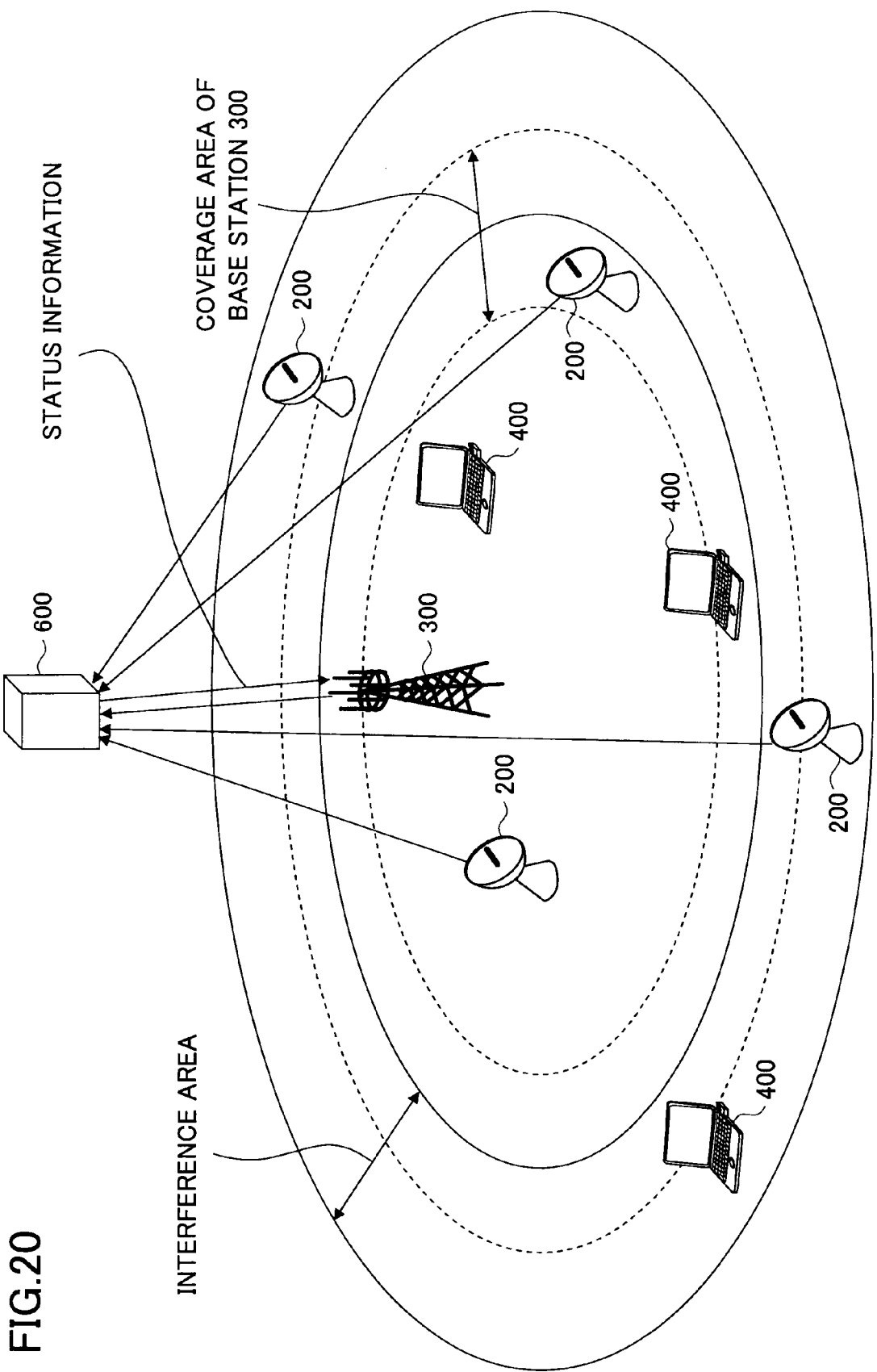
FIG. 20 is a drawing illustrating a communication environment where a wireless communication system according to an embodiment of the present invention is used.

A wireless communication system in any one of the above embodiments may also include a server as shown in FIG. 20. In FIG. 20, multiple receiving devices 200 are present around the base station 300. Specifically, multiple receiving devices 200 of the wireless communication system 1000, which is a priority system, are set up around the base station 300 of the wireless communication system 2000.

Figure 21:
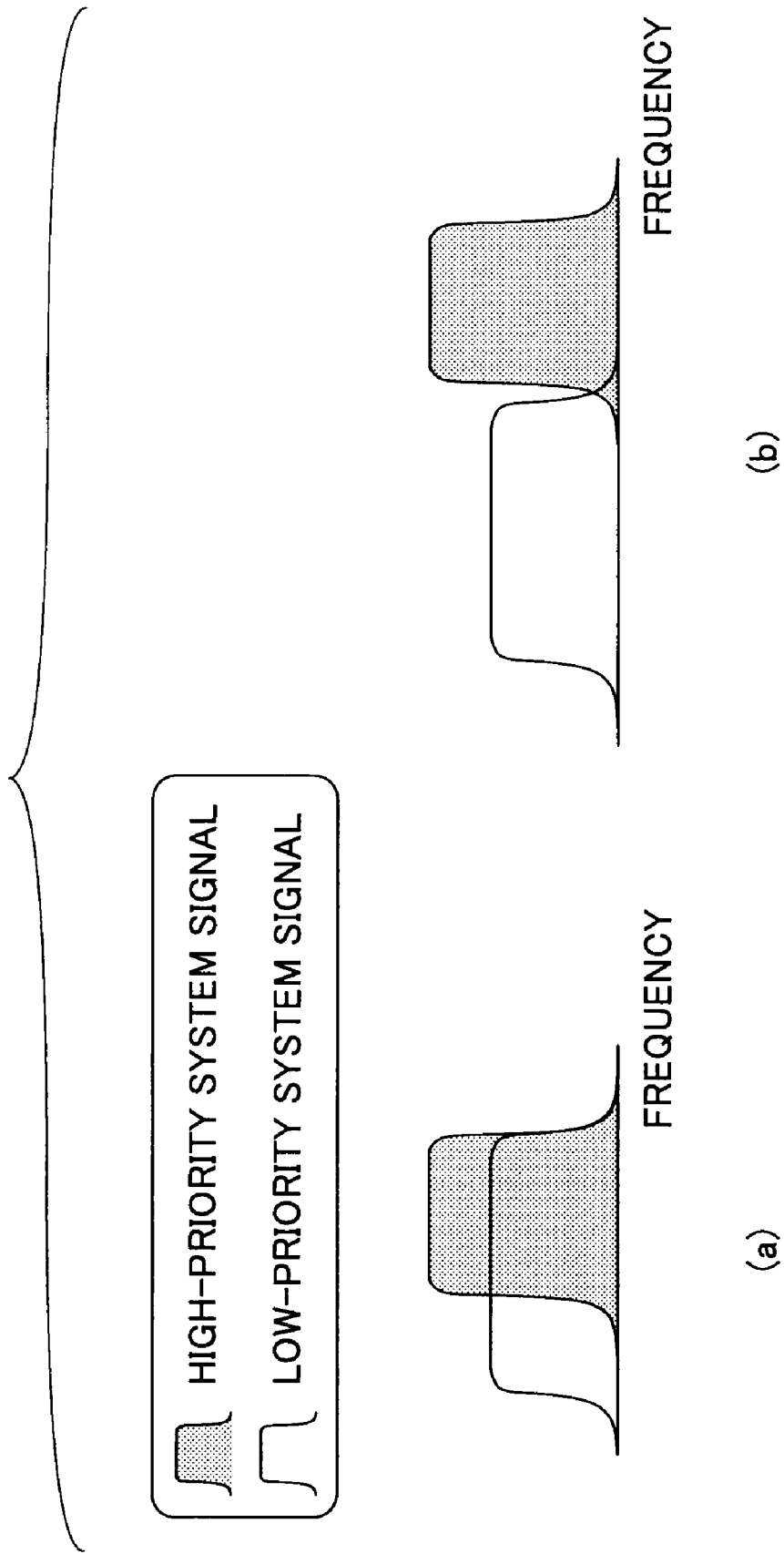
FIG. 21 is a drawing illustrating an exemplary occupied frequency band of a wireless communication system according to an embodiment of the present invention.

As shown in FIG. 21, the wireless communication system 2000 uses the same frequency band and/or a frequency band close (adjacent) to that of the wireless communication system 1000. FIG. 21(a) shows a case where the frequency band of the wireless communication system 2000 (low-priority system) overlaps the frequency band of the wireless communication system 1000 (high-priority system). In other words, the wireless communication systems 2000 and 1000 use substantially the same frequency band. FIG. 21(b) shows a case where the frequency band of the wireless communication system 2000 is adjacent to the frequency band of the wireless communication system 1000. There is also a case where the wireless communication system 2000 uses at least a part of the frequency band used by the wireless communication system 1000.

In FIG. 20, the base station 300 and the receiving devices 200 report their locations to a server 600. The server 600 manages frequency bands used by the base station 300 and the receiving devices 200. Also, the server 600 stores priority system information regarding the wireless communication system 1000. The priority system information includes locations of the receiving devices 200, an allowable interference level, an operating frequency band, and an operating frequency.

The server 600 obtains the maximum transmission power density of the wireless communication system 2000 in a manner similar to that described in the above embodiments. This process is described in more detail below.

As shown in FIG. 22(a), the server 600 may be configured to divide an available frequency resource into sub-bands with a predetermined bandwidth and to calculate the maximum transmission power density for each of the sub-bands. The sub-bands are hereafter called reference bands. In this case, for each receiving device 200 of the wireless communication system 1000, the server 600 calculates, based on information on the receiving device 200, allowable interference power densities of reference bands used by the receiving device 200 and reference bands adjacent to the used reference bands. In other words, the server 600 calculates the maximum transmission power for each of the reference bands obtained by dividing the available frequency resource in such a manner that interference conditions are satisfied.

This method of calculating the maximum transmission power for each reference band may also be applied to the above embodiments.

Figure 22:
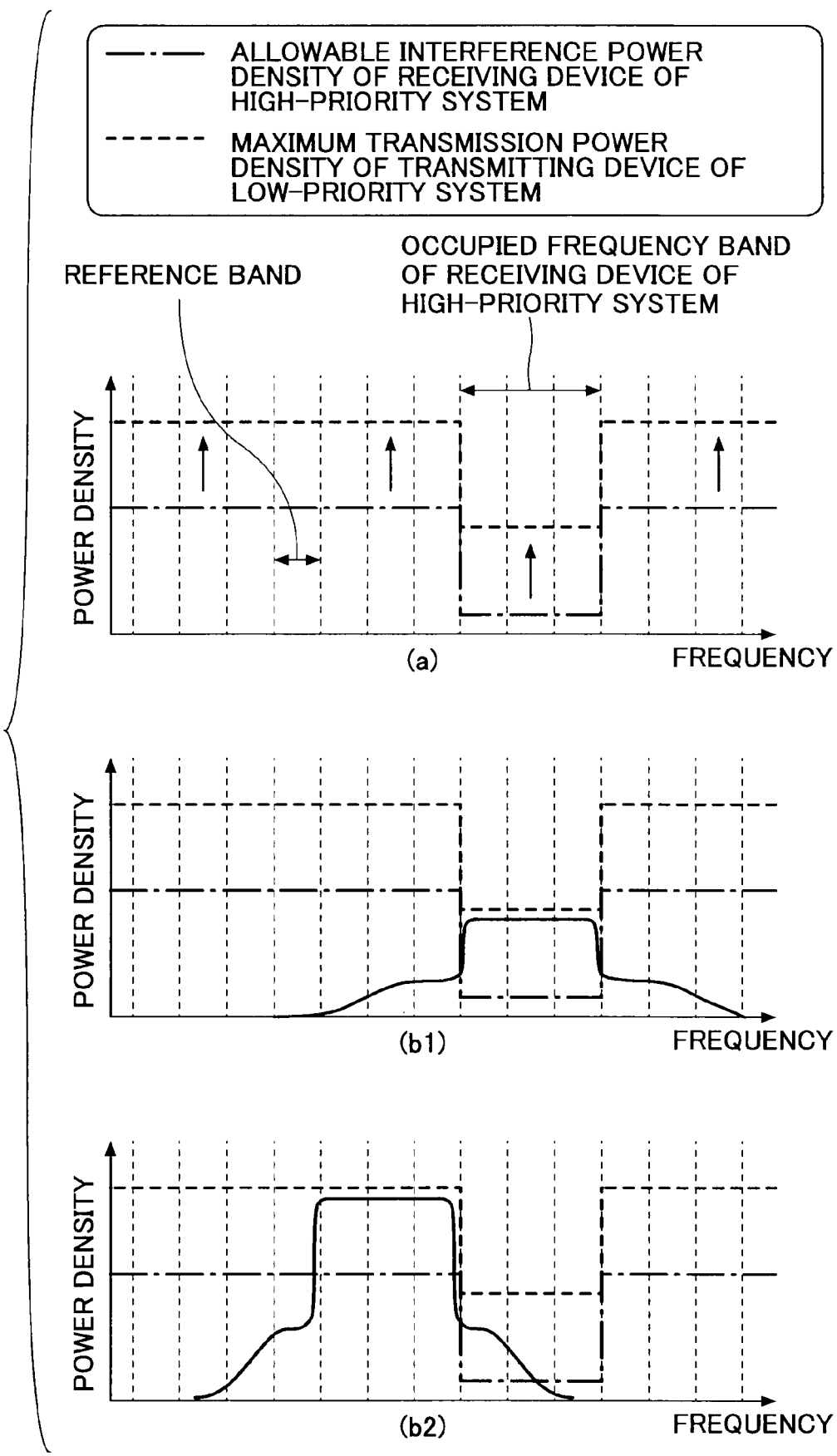
FIG. 22 is a drawing illustrating transmission power control in a wireless communication system according to an embodiment of the present invention.
Figure 23:
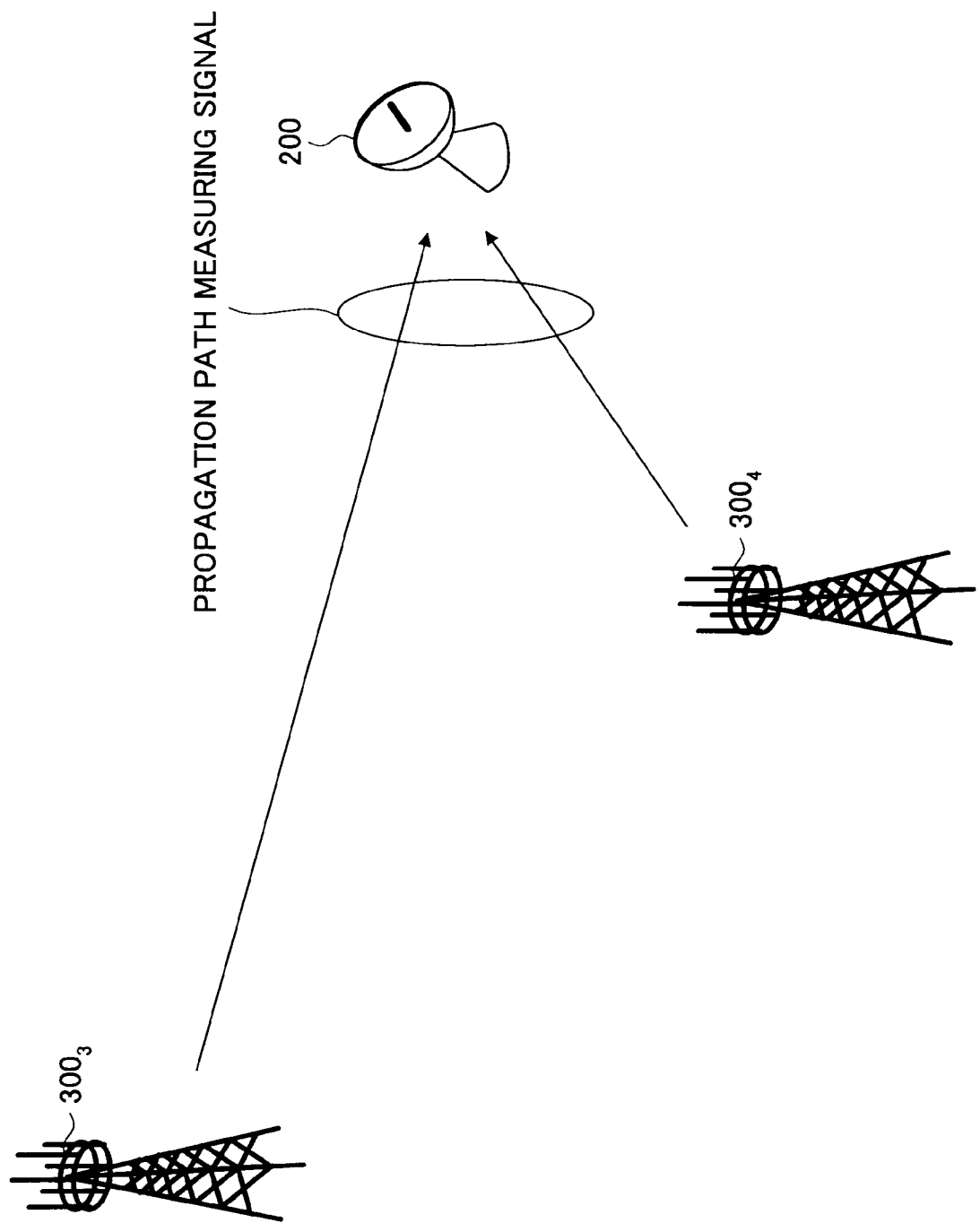
FIG. 23 is a drawing used to describe a method of calculating propagation loss and distances between base stations and a receiving device.

The server 600 estimates a path loss between the base station 300 of the wireless communication system 2000 (low-priority system) and each of the receiving devices 200 of the wireless communication system 1000 (high-priority system). The path loss is estimated based on the location information of the base station 300 and the corresponding receiving device 200. Then, the server 600 calculates allowable transmission power densities as described above. FIG. 22 (b1) shows a case where the low-priority system uses the same frequency band as that of the high-priority system. FIG. 22 (b2) shows a case where the low-priority system uses a frequency band adjacent to that of the high-priority system. Here, the server 600 may be configured to calculate allowable transmission power densities for the respective receiving devices 200 and to select the lowest value from the calculated allowable transmission power densities.

The server 600 sends the allowable transmission power density for each of the reference bands to the base station 300 of the wireless communication system 2000 (low-priority system). The base station 300 determines the transmission power of each of the reference bands according to the corresponding allowable transmission power density. According to embodiments of the present invention, transmission conditions of a wireless communication system using a frequency band that is the same as or close to that of another wireless communication system are determined based on a frequency difference and a distance between the systems. This method allows a wireless communication system to share a frequency band with another wireless communication system while maintaining the throughput.

Ninth Embodiment

In a ninth embodiment of the present invention, propagation losses and distances between the base stations 300 (300$_3$ and 300$_4$) and the receiving device 200 are calculated based on propagation path measuring signals transmitted from the base stations 300 to the receiving device 200. The propagation path measuring signal is transmitted, for example, by the transmission control unit 308 via the transmission signal generating unit 310.

In this case, if multiple propagation path measuring signals from the base stations 300 are combined when they are received by the receiving device 200, the receiving device 200 cannot correctly distinguish the propagation path measuring signals and therefore cannot accurately calculate the propagation losses and distances between the receiving device 200 and the respective base stations 300. Therefore, it is necessary to take a measure to allow the receiving device 200 to distinguish propagation path measuring signals from different base stations 300. This can be achieved, for example, by including codes unique to the respective base stations 300 in the propagation path measuring signals, by using different frequencies for the respective propagation path measuring signals, or by transmitting the propagation path measuring signals at different timings. FIG. 24 shows an exemplary format of the propagation path measuring signal. The propagation path measuring signal includes the following fields: a preamble, a base station identification number, a base station frequency band, and a transmission power value. The preamble is substantially the same as that of the priority system information signal shown in FIG. 13. The base station identification number is a unique number assigned to the base station 300 and is used to identify the base station 300. The base station frequency band indicates the frequency band used by the base station 300. The transmission power value indicates the transmission power of the propagation path measuring signal.

In this embodiment, transmission timings (measurement timings) of the propagation path measuring signals are reported by the base stations 300 to the receiving device 200. The transmission timings may be predetermined and stored in the respective base stations 300 and the receiving device 200. Alternatively, the receiving device 200 may be configured to generate transmission timing control information for controlling transmission timings of the propagation path measuring signals from the base stations 300 and to send the transmission timing control information to the base stations 300, for example, via a wired network described in the first embodiment. Even when only one base station 300 is in an area, it is preferable for the receiving device 200 to know the transmission timing of the propagation path measuring signal in order to reduce the time necessary for the reception process of the propagation path measuring signal and thereby to reduce power consumption.

To estimate propagation losses, the method described in the sixth embodiment may be used.

If the reception level of a propagation path measuring signal received by the receiving device 200 is too low, the propagation path measuring signal is preferably retransmitted at another timing or using a different frequency.

The propagation path measuring signal is preferably transmitted using a frequency band different from that used by the priority system in order to prevent interference with the priority system. However, it is difficult to correctly estimate propagation loss using a frequency band different from that used by the priority system because different frequency bands show different propagation characteristics.

This problem can be solved or reduced by reducing the influence of fading on the measurement of the propagation path measuring signal using multiple frequency bands, by estimating propagation loss based on shadowing and the distance between transmitting and receiving devices, and by using a fading margin to compensate for the fading that occurs in the frequency bands used to transmit the propagation path measuring signal.

Also, the above problem may be solved or reduced as described in the sixth embodiment by calculating the distance based on estimated propagation loss and by correcting the propagation loss based on the frequency band used for actual communications and the calculated distance.

Meanwhile, the following two methods may be used to estimate propagation loss using a frequency band used by the priority system:

Method 1:

First, a receiving device 200 (of a priority system) that is likely to be interfered with is identified based on its geographical location. The identified receiving device 200 reports to the base station 300 a time slot during which the allocated frequency band is not used. The base station 300 transmits the propagation path measuring signal during the reported time slot. The time slot is reported, for example, via the wired network described in the first embodiment.

Method 2:

First, a receiving device 200 (of a priority system) that is likely to be interfered with is identified based on its geographical location. The base station 300 reports a transmission timing of the propagation path measuring signal to the identified receiving device 200. The receiving device 200 refrains from sending and receiving signals at the reported transmission timing.

The propagation losses and/or the distances calculated in this embodiment are transmitted to the respective base stations 300, for example, via the wired network described in the first embodiment, and the maximum transmission power is calculated by the base stations 300 based on the propagation losses and/or the distances.

In the above methods, propagation loss is estimated each time as needed. Alternatively, propagation losses between multiple base stations 300 and the receiving device 200 may be stored in a database in advance and the transmission power of the base stations 300 may be controlled based on the stored propagation losses and the location information of the base stations 300 and the receiving device 200.

Embodiments of the present invention provide a base station, a receiving device, a mobile terminal, and a frequency sharing method that make it possible to maintain the throughput even when a wireless communication system shares a frequency band with another wireless communication system and transmission conditions are restricted to prevent interference with the other wireless communication system.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

Although functional block diagrams are used to describe devices in the above embodiments, those devices may be implemented by hardware, software, or a combination of them. The present invention is not limited to the specifically disclosed embodiments, and variations and modifications may be made without departing from the scope of the present invention.

The present application is based on Japanese Priority Application No. 2007-255742 filed on Sep. 28, 2007 and Japanese Priority Application No. 2008-204678 filed on Aug. 7, 2008, the entire contents of which are hereby incorporated herein by reference.

What is claimed is:

1. A base station in a first wireless communication system using a first frequency band that is the same as or adjacent to a second frequency band used by a second wireless communication system, the base station comprising:
   a propagation loss estimation unit configured to estimate propagation loss of a signal in the first frequency band when the signal arrives at a receiving device of the second wireless communication system;
   a frequency difference calculation unit configured to calculate a frequency difference between the first frequency band and the second frequency band;
   a maximum transmission power determining unit configured to determine maximum transmission power based on the propagation loss estimated by the propagation loss estimation unit and the frequency difference calculated by the frequency difference calculation unit; and
   a transmission control unit configured to transmit a signal with transmission power less than or equal to the maximum transmission power determined by the maximum transmission power determining unit.

2. The base station as claimed in claim 1, further comprising:
a system information receiving unit configured to receive a frequency restriction signal for restricting the use of a specified frequency band from the receiving device, the frequency restriction signal including an occupied frequency band of the second wireless communication system and a transmission power value of the frequency restriction signal;
wherein the propagation loss estimation unit is configured to estimate the propagation loss based on received power of the frequency restriction signal and the transmission power value in the frequency restriction signal.

3. The base station as claimed in claim 1, wherein
the transmission control unit is configured to transmit a propagation path measuring signal including a transmission power value of the propagation path measuring signal to the receiving device; and
the maximum transmission power determining unit is configured to determine the maximum transmission power based on the frequency difference calculated by the frequency difference calculation unit and the propagation loss estimated by the receiving device based on received power of the propagation path measuring signal and the transmission power value in the propagation path measuring signal.

4. A base station in a first wireless communication system using a first frequency band that is the same as or adjacent to a second frequency band used by a second wireless communication system, the base station comprising:
a frequency difference calculation unit configured to calculate a frequency difference between the first frequency band and the second frequency band;
a distance calculation unit configured to calculate a distance between the base station and a receiving device of the second wireless communication system;
a maximum transmission power determining unit configured to determine maximum transmission power based on the frequency difference calculated by the frequency difference calculation unit and the distance calculated by the distance calculation unit; and
a transmission control unit configured to transmit a signal with transmission power less than or equal to the maximum transmission power determined by the maximum transmission power determining unit.

5. The base station as claimed in claim 4, further comprising:
a system information receiving unit configured to receive a frequency restriction signal for restricting the use of a specified frequency band from the receiving device, the frequency restriction signal including an occupied frequency band of the second wireless communication system and a transmission power value of the frequency restriction signal;
wherein the distance calculation unit is configured to calculate the distance between the base station and the receiving device based on received power of the frequency restriction signal and the transmission power value in the frequency restriction signal.

6. The base station as claimed in claim 4, wherein
the transmission control unit is configured to transmit a propagation path measuring signal including a transmission power value of the propagation path measuring signal to the receiving device; and
the maximum transmission power determining unit is configured to determine the maximum transmission power based on the frequency difference calculated by the frequency difference calculation unit and the distance between the base station and the receiving device calculated by the receiving device based on received power of the propagation path measuring signal and the transmission power value in the propagation path measuring signal.

7. The base station as claimed in claim 1 or 4, wherein the maximum transmission power determining unit is configured to determine the maximum transmission power based on a tilt angle of an antenna to be used for transmission by the base station.

8. The base station as claimed in claim 1 or 4, wherein the maximum transmission power determining unit is configured to determine the maximum transmission power based on an allowable interference level of the second wireless communication system.

9. The base station as claimed in claim 1 or 4, wherein the maximum transmission power determining unit is configured to determine the maximum transmission power based on a direction in which the receiving device of the second wireless communication system is located.

10. The base station as claimed in claim 1 or 4, wherein the maximum transmission power determining unit is configured to determine the maximum transmission power based on receiving antenna directivity of the receiving device of the second wireless communication system.

11. The base station as claimed in claim 1 or 4, wherein the maximum transmission power determining unit is configured to determine the maximum transmission power based on antenna directivity of the base station.

12. The base station as claimed in claim 2 or 5, wherein the frequency restriction signal includes an allowable interference level of the second wireless communication system.

13. The base station as claimed in claim 1 or 4, wherein the maximum transmission power determining unit is configured to determine the maximum transmission power based on a height at which a transmitting antenna of the base station is located.

14. The base station as claimed in claim 1 or 4, wherein the maximum transmission power determining unit is configured to determine the maximum transmission power based on a frequency waveform of a transmission signal, the frequency waveform including a transmit spectrum mask.

15. The base station as claimed in claim 1 or 4, wherein the maximum transmission power determining unit is configured to determine the maximum transmission power based on geographical conditions surrounding a geographical location of the base station.

16. The base station as claimed in claim 1 or 4, wherein the maximum transmission power determining unit is configured to determine the maximum transmission power based on whether the base station is located indoors or outdoors.

17. The base station as claimed in claim 1 or 4, wherein the maximum transmission power determining unit is configured to use different usage rates of the first frequency band for an inner area and an outer area of a cell covered by the base station, the inner area being closer to the base station and the outer area being further from the base station.

18. The base station as claimed in claim 17, wherein the maximum transmission power determining unit is configured to change the usage rates of the first frequency band according to the amounts of traffic and/or the geographical distribution of users in the inner area, the outer area, and cells covered by other base stations.

19. The base station as claimed in claim 18, wherein the maximum transmission power determining unit is configured to use the distribution of signal-to-interference-plus-noise ratios of the users as the geographical distribution of users.

20. The base station as claimed in claim 1 or 4, wherein the maximum transmission power determining unit is configured to determine a usage rate of the first frequency band based on the determined maximum transmission power.

21. The base station as claimed in claim 1 or 4, wherein the maximum transmission power determining unit is configured to determine a usage rate of the first frequency band based on the amount of traffic in a cell covered by the base station and the amounts of traffic in cells covered by other base stations.

22. The base station as claimed in claim 1 or 4, wherein when multiple frequency bands are available, the maximum transmission power determining unit is configured to select one of the frequency bands for transmission based on a frequency usage rate, system information sent from the second wireless communication system, a transmission power restriction, and propagation loss between the base station and the receiving device.

23. The base station as claimed in claim 22, wherein the maximum transmission power determining unit is configured to select one of the frequency bands based on communication quality or transmission efficiency.

24. A mobile terminal in a first wireless communication system using a first frequency band that is the same as or adjacent to a second frequency band used by a second wireless communication system, the mobile terminal comprising:
- a frequency difference calculation unit configured to calculate a frequency difference between the first frequency band and the second frequency band;
- a distance calculation unit configured to calculate a distance between the mobile terminal and a receiving device of the second wireless communication system;
- a maximum transmission power determining unit configured to determine maximum transmission power based on the frequency difference calculated by the frequency difference calculation unit and the distance calculated by the distance calculation unit; and
- a transmission control unit configured to transmit a signal with transmission power less than or equal to the maximum transmission power determined by the maximum transmission power determining unit.

25. A frequency sharing method performed by a base station in a first wireless communication system using a first frequency band that is the same as or adjacent to a second frequency band used by a second wireless communication system, the method comprising:
- a frequency difference calculation step of calculating a frequency difference between the first frequency band and the second frequency band;
- a distance calculation step of calculating a distance between a mobile terminal of the first wireless communication system and a receiving device of the second wireless communication system;
- a maximum transmission power determining step of determining maximum transmission power based on the frequency difference calculated in the frequency difference calculation step and the distance calculated in the distance calculation step; and
- a transmission control step of transmitting a signal with transmission power less than or equal to the maximum transmission power determined in the maximum transmission power determining step.

* * * * *